United States Patent
Doğan et al.

(10) Patent No.: US 8,608,829 B1
(45) Date of Patent: Dec. 17, 2013

(54) CU—PD—M HYDROGEN SEPARATION MEMBRANES

(75) Inventors: Ömer N. Doğan, Corvallis, OR (US); Michael C. Gao, Albany, OR (US); Rongxiang Hu Young, Independence, OR (US); De Nyago Tafen, Albany, OR (US)

(73) Assignee: U.S. Department of Energy, Washington, DC (US)

( * ) Notice: Subject to any disclaimer, the term of this patent is extended or adjusted under 35 U.S.C. 154(b) by 334 days.

(21) Appl. No.: 13/208,403

(22) Filed: Aug. 12, 2011

(51) Int. Cl.
*B01D 53/22* (2006.01)
*B01D 71/02* (2006.01)

(52) U.S. Cl.
USPC .......................... 95/56; 96/4; 96/11; 420/464

(58) Field of Classification Search
USPC .......................... 95/55, 56; 96/4, 11; 420/464
See application file for complete search history.

(56) References Cited

U.S. PATENT DOCUMENTS

| | | | |
|---|---|---|---|
| 3,155,467 A * | 11/1964 | Yamamoto et al. | 95/56 |
| 4,496,373 A * | 1/1985 | Behr et al. | 95/56 |
| 7,033,641 B2 * | 4/2006 | Saijo et al. | 95/56 |
| 7,655,183 B2 | 2/2010 | Benn et al. | |
| 2007/0240566 A1 * | 10/2007 | Benn et al. | 95/56 |
| 2012/0325087 A1 * | 12/2012 | Tsai et al. | 95/56 |

FOREIGN PATENT DOCUMENTS

JP 2011-202258 * 10/2011 ............. B01D 53/22

OTHER PUBLICATIONS

Kamakoti et al., "Towards first principles-based identification of ternary alloys for hydrogen purification membranes," Journal of Membrane Science 279 (2006).
Coulter et al., "Predicting, Fabricating, and Permeability Testing of Free-Standing Ternary Palladium-Copper-Gold Membranes for Hydrogen Separation," J. Phys. Chem. C 114 (2010).
Semidey-Flecha et al., "Detailed first-principles models of hydrogen permeation through PdCu-based ternary alloys," Journal of Membrane Science 362 (2010).
Ling et al., "First-principles screening of PdCuAg ternary alloys as H2 purification membranes," Journal of Membrane Science 371 (2011).

* cited by examiner

*Primary Examiner* — Jason M Greene
(74) *Attorney, Agent, or Firm* — James B. Potts; Brian J. Lally; John T. Lucas

(57) ABSTRACT

The disclosure provides an H2 separation membrane comprised of an alloy having the composition $Cu_{(100-x-y)}Pd_xM_y$, where x is from about 35 to about 50 atomic percent and where y is from greater than 0 to about 20 atomic percent, and where M consists of magnesium, yttrium, aluminum, titanium, lanthanum, or combinations thereof. The M elements act as strong stabilizers for the B2 phase of the alloy, and extend the critical temperature of the alloy for a given hydrogen concentration and pressure. Due to the phase stabilization and the greater temperature range over which a B2 phase can be maintained, the alloy is well suited for service as a H2 separation membrane, particularly when applicable conditions are established or cycled above about 600° C. over the course of expected operations. In certain embodiments, the B2 phase comprises at least 60 estimated volume percent of the alloy at a steady-state temperature of 400° C. The B2 phase stability is experimentally validated through HT-XRD.

20 Claims, 21 Drawing Sheets

CU—PD—M HYDROGEN SEPARATION MEMBRANES

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure relates to an $H_2$ separation membrane comprised of an alloy having the composition $Cu_{(100-x-y)}Pd_xM_y$, where x is from about 35 to about 50 atomic percent and where y is from greater than 0 to about 20 atomic percent, and where M consists of Magnesium, Yttrium, Aluminum, Titanium, Lanthanum, or combinations thereof. The M elements act as strong stabilizers for the B2 phase of the alloy, and extend the critical temperature of the alloy for a given hydrogen concentration and pressure. The alloy is particularly well suited for service as a $H_2$ separation membrane when applicable conditions are established or cycled above about 600° C. over the course of expected operations.

BACKGROUND

The separation of hydrogen from gas mixtures is a crucial process in existing and envisioned uses of hydrogen as a chemical feedstock and fuel. Membranes comprised of thin films of metals are a well-known technology for achieving the separation. The membranes are designed with multiple performance objectives in mind, such as delivering high hydrogen flux, showing long-term operability over broad ranges of temperature and pressure, and resistance to poisoning and degradation by gas contaminants.

In separation operations, hydrogen permeates through metal membranes by means of a unique mechanism in which $H_2$ dissociatively adsorbs on the catalytically active surface of the metal, producing hydrogen atoms which diffuse through the interstices of the bulk metal lattice and recombine on the opposite surface. Diffusion through the bulk metal is limited to hydrogen atoms, and an infinite selectivity for $H_2$ separation can be achieved. Generally, for sufficiently thick membranes with sufficiently high $H_2$ dissociation rates on the surface, hydrogen atom diffusion through the bulk limits the overall rate of hydrogen transport. Palladium (Pd) has been distinguished from other pure metal membranes by the high $H_2$ dissociation activity of the Pd surface and the high hydrogen atom permeability of bulk Pd. However, in pure Pd membranes, alpha $\leftrightarrow$ beta phase transformations during hydrogen loading/un-loading and temperature cycles introduces severe lattice strains, causing pure Pd membranes to become brittle. This can be greatly mitigated by alloying Pd with other metals, such as Silver (Ag), Copper (Cu), Gold (Au), Yttrium (Y), Cerium (Ce) and others.

Pd—Cu alloys are particularly effective due to a high $H_2$ diffusivity and a resistance to sulfur compounds such as $H_2S$ which may also be present in a gaseous mixture. Additionally, Pd—Cu alloys exhibit B2 and fcc phases over the range of composition and temperature. See, e.g., Subramanian et al., "Cu—Pd (Copper-Palladium)," *Journal of Phase Equilibria*, Vol 12, No. 2 (1991). It is generally accepted that the B2 phase fosters a higher permeability value than the fcc phase due to a higher mobility of hydrogen atoms within the B2 crystal structure. See e.g., Howard et al., "Hydrogen permeance of palladium-copper alloy membranes over a wide range of temperatures and pressures," *Journal of Membrane Science* 241 (2004); see also Opalka et al., "Hydrogen interactions with the PdCu ordered B2 alloy," *Journal of Alloys and Compounds* 446-447 (2007). However, implementation of Pd—Cu alloy membranes is challenging due to Pd—Cu phase behavior and the nature of the B24 $\leftrightarrow$ fcc phase transition. A single B2 phase composition may not be stable upon thermal cycling to higher temperatures, and the formation of the fcc phase with a different molar volume compromises the integrity and H-selectivity of the membrane in such operations. Further, persistent structural and stoichiometric segregation may be induced by cycling through the two phase region (B2+fcc), and residual fcc phases can reduce the $H_2$ permeability of B2 membranes significantly. Another aspect of fcc/B2 mixed phase morphologies is a possible propensity for defect formation along the grain boundaries between fcc and B2 domains. See e.g., Goldbach et al., "Impact of the fcc/bcc phase transition on the homogeneity and behavior of PdCu membranes," *Separation and Purification Technology* 73 (2010). Correspondingly, increased stability of the B2 phase over a wider temperature range would be an advantageous feature of a Pd—Cu based membrane, and would provide significant utility for applications that require frequent thermal cycling, such as cycling down to ambient temperatures.

Further, stability over a wide temperature range would preserve the higher permeability value of the B2 phase of Pd—Cu based membranes during operations at temperatures above the Pd—Cu critical temperature. The maximum temperature at which any bcc phase is stable is about 873K (600° C.). As a result, in certain operations such as coal gasification, steam reforming, and catalytic partial oxidation, where temperatures of up to 900° C. may be expected, maintenance of the B2 phase and the resulting higher $H_2$ permeability is not realizable. It would be clearly advantageous to provide a Pd—Cu based alloy for $H_2$ separation membranes capable of maintaining a B2 phase and the associated $H_2$ permeability values for these higher temperature operations. Another specific advantage could accrue in potentially enabling membrane reactors to simultaneously employ $H_2$ and $O_2$ membranes during autothermal reforming, where endothermic heat requirements are met by partially combusting or oxidizing methane. Currently, oxygen membranes based on dense mixed ionic electronic conducting perovskite materials are operated above 950-1000° C., which clearly exceeds the B2 phase critical temperature of generally about 600° C. for Pd—Cu $H_2$ separation membranes. This dichotomy has necessitated purposely created temperature zones for the respective $H_2$ and $O_2$ membranes rather than integration of the membranes into one single unit. See e.g., Patil et al., "Design of a Novel Autothermal Membrane-Assisted Fluidized-Bed Reactor for the Production of Ultrapure Hydrogen from Methane," *Ind. Eng. Chem. Res.* 44 (2005), among others. A Pd—Cu based alloy exhibiting B2 phase stability over a wider temperature range would significantly mitigate the operating temperature ranges and potentially allow for a significantly more streamlined operation.

Ternary alloys based on Cu—Pd based compositions have been investigated for use as $H_2$ separation membranes using first-principle methods on high Pd content (>70 at. %) ternary alloys of Cu, Pd, and a metal M. These computational efforts concentrate on Pd rich compositions where the materials exist as substitutionally random fcc alloys, in order to preserve the higher $H_2S$ resistance observed in fcc structures. Ternary Cu—Pd-M alloys in an fcc structure, where Pd is present at 70 at. % or greater, and where M=V, Zr, Nb, Ru, Rh, Ta, Ti, Pt, Ag, and Au, have been investigated. See e.g., Kamakoti et al., "Towards first principles-based identification of ternary alloys for hydrogen purification membranes," *Journal of Membrane Science* 279 (2006); see also Coulter et al., "Predicting, Fabricating, and Permeability Testing of Free-Standing Ternary Palladium-Copper-Gold Membranes for Hydrogen Separation," *J. Phys. Chem. C* 114 (2010); see also Semidey-Flecha et al., "Detailed first-principles models of hydrogen permeation through PdCu-based ternary alloys," *Journal of Membrane Science* 362 (2010); see also Ling et al., "First-principles screening of PdCuAg ternary alloys as $H_2$ purification membranes," *Journal of Membrane Science* 371 (2011). These efforts limit the ternary compositions to compositions providing Pd-rich fcc regimes, and do not investigate or discuss compositions leading to potential expansion of applicable temperature ranges for the B2 phase of ternary Cu—Pd-M alloys.

It would be advantageous to provide an $H_2$ separation membrane comprised of a ternary Cu—Pd-M alloy which exhibits and extends a B2 phase, and which mitigates the B24 ↔ fcc transition in cycling temperature operations. Such a membrane would mitigate negative impacts of the B24 ↔ fcc transition on mechanical stability, such as changes in molar volume and defect formation along B2 and fcc boundaries. Further, such a membrane would mitigate the impact of persistant structural and stoichiometric segregation induced by repeated cycling through a two phase region (B2+ fcc). Extension of the B2 phase would additionally preserve higher permeability values during operations at temperatures above the Pd—Cu critical temperature.

SUMMARY

The disclosure provides an $H_2$ separation membrane comprised of an alloy having the composition $Cu_{(100-x-y)}Pd_xM_y$, where x is from about 35 to about 50 atomic percent and where y is from greater than 0 to about 20 atomic percent, and where M consists of magnesium, yttrium, aluminum, titanium, lanthanum, or combinations thereof. The $Cu_{(100-x-y)}Pd_xM_y$ alloy maintains a B2 phase at temperatures exceeding comparable Cu—Pd alloys, and allows for utilization of the higher $H_2$ permeability of the B2 phase in higher temperature operations such as coal gasification, steam reforming, catalytic partial oxidation, and autothermal reforming, where temperatures exceeding the critical temperature of Cu—Pd alloys are routinely exceeded.

In the alloy $Cu_{(100-x-y)}Pd_xM_y$, the M elements act as strong stabilizers for the B2 phase of the alloy, and extend the critical temperature of the alloy for a given hydrogen concentration and pressure. Due to the phase stabilization and the greater temperature range over which a B2 phase can be maintained, the alloy is well suited for service as a $H_2$ separation membrane, particularly when applicable conditions are established or cycled above about 600° C. over the course of expected operations. In certain embodiments, the B2 phase comprises at least 60 estimated volume percent of the alloy at a steady-state temperature of 400° C.

The ternary Cu—Pd-M alloys were developed through the use of first principles density functional theory to determine potential alloying elements M that would stabilize the B2 structure, followed by subsequent experimentation and evaluation for validation of the predictions. 34 potential M stabilizers were evaluated and initial computational work indicated potential B2 phase stabilization for the alloying elements M for elements Sc, Ti, Zn, Y, Hf, La, Al, and Mg. Based on the initial screening, phase stabilization of the 7 alloying elements (Ti, Zr, Hf, Y, La, Al and Mg) was investigated experimentally using the nominal compositions $Cu_{50}Pd_{43.75}M_{6.25}$ and $Cu_{66}Pd_{27.75}M_{6.25}$. The 14 alloys were prepared by melting in a vacuum arc furnace back-filled with high purity argon and subjected to an equilibration annealing at 400° C. for 21 days.

High-temperature x-ray diffraction (HT-XRD) was performed to determine the temperature limits of the B2 phase in each ternary $Cu_{50}Pd_{43.75}M_{6.25}$ alloy, where M=Mg, Y, Al, Ti, La, Zr, and Hf. The HT-XRD was conducted at a baseline temperature of 25° C. and additionally at temperatures generally between 500° C. and 950° C. for each alloy, in order to validate potential B2 phase stabilizing effects at temperatures greater than 600° C. The HT-XRD indicated phase stabilization occurs when Mg, Y, Al, Ti, La are utilized as alloying elements. The alloying elements Zr and Hf failed to produce significant phase stabilization.

Based on the experimental results and evaluation of various $Cu_{(100-x-y)}Pd_xM_y$ alloys, where x is from about 35 to about 50 at. % and y is greater than 0 and less than about 20 at. %, 5 alloying elements corresponding to M=Mg, Y, Al, Ti, and La are identified which can greatly improve hydrogen separation performance at much lower cost compared to pure Pd or Pd—Cu binary membrane alloys. In an embodiment where M=Y, TI, La or combinations thereof, the alloy is comprised of from greater than 0 to about 10 at. % M. The compositional ranges have great potential in reducing Pd contents, expanding the B2 phase field towards higher temperatures, achieving higher hydrogen permeability at higher temperatures, and achieving improved resistance against sulfur poisoning, among other advantages The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an $H_2$ separation membrane comprised of a ternary Cu—Pd-M alloy exhibiting a B2 phase at increased temperatures.

The disclosure herein provides an $H_2$ separation membrane comprised of an alloy having the composition $Cu_{(100-x-y)}Pd_xM_y$, where x is from about 35 to about 50 atomic percent and where y is from greater than 0 to about 20 atomic percent, and where M consists of magnesium, yttrium, aluminum, titanium, lanthanum, or combinations thereof. The $Cu_{(100-x-y)}Pd_xM_y$ alloy is comprised of a B2 phase of Cu, Pd, and M atoms. Generally, the B2 phase is an alternating series of first layers and second layers, where the first layer consists of a plane of the Cu atoms along a [100] direction of the crystal structure, and where the second layer consists of a plane of the Pd and the M atoms along the [100] direction of the crystal structure.

The $Cu_{(100-x-y)}Pd_xM_y$ alloy maintains a B2 phase at temperatures exceeding comparable Cu—Pd alloys, and allows for utilization of the higher $H_2$ permeability of the B2 phase in higher temperature operations such as coal gasification, steam reforming, catalytic partial oxidation, and autothermal reforming, where temperatures exceeding the critical temperature of Cu—Pd alloys are routinely exceeded. The stability of the B2 phase in the $Cu_{(100-x-y)}Pd_xM_y$ alloy additionally mitigates negative structural and performance impacts which arise from repeated cycling through the B24 ↔ fcc phase fields over the course of expected operations. The $Cu_{(100-x-y)}Pd_xM_y$ alloy functions as an $H_2$ separation membrane through dissolution and recombinative desorption of $H_2$.

Figure 1:
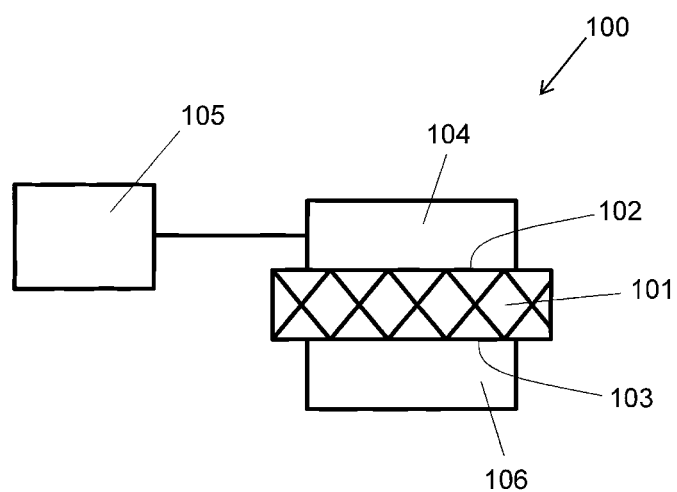
FIG. 1 illustrates an H2 separation apparatus and an H2 separation membrane comprised of the $Cu_{(100-x-y)}Pd_xM_y$ alloy.

FIG. 1 illustrates an $H_2$ separation apparatus generally at 100 comprised of $H_2$ separation membrane 101 having retentate side 102 and permeate side 103. Retentate side 102 of $H_2$ separation membrane 101 is in fluid communication with gaseous mixture reservoir 104. $H_2$ separation membrane 101 is a ternary alloy comprised of Cu, Pd, and a metal M, and in operation serves to separate $H_2$ from a gaseous mixture comprised of $H_2$ and contained by gaseous mixture reservoir 104 through dissociative chemisorptions of hydrogen on retentate side 102, dissolution of atomic hydrogen from the retentate side 102, concentration-driven diffusion of atomic hydrogen through $H_2$ separation membrane 101, and recombinative desorption from permeate side 103, as is known in the art. See e.g., Opalka et al., "Hydrogen interactions with the PdCu ordered B2 alloy," *Journal of Alloys and Compounds* 446-447 (2007), among others.

$H_2$ separation membrane 101 is comprised of an alloy having the composition $Cu_{(100-x-y)}Pd_xM_y$, where M is a phase stabilizer consisting of magnesium, yttrium, aluminum, titanium, lanthanum, or combinations thereof. In the formulation, x is from about 35 to about 50 atomic percent, and y is greater than 0 and less than about 20 atomic percent. The M elements listed act as strong stabilizers for the B2 phase of the alloy, and extend the critical temperature of the alloy for a given hydrogen concentration and pressure. The ability of $H_2$ separation membrane 101 to maintain a B2 phase provides distinct advantages for operations at elevated temperatures. In certain embodiments, the B2 phase comprises at least 60 estimated volume percent of the alloy at a steady-state temperature of 400° C.

Within this disclosure, the term "B2 phase" means an interpenetrating simple cubic structure, also called the cesium chloride (CsCl) structure, formed by two separate elemental atoms, wherein each of the two separate elements forms a separate simple cubic lattice, with an atom of one element at the center of each cube of the other element. Altogether, the arrangement of atoms is the same as body-centered cubic, but with alternating types of atoms at the different lattice sites. The coordination number of each atom in the structure is 8. See e.g., Y. Quéré, *Physics of Materials* (CRC Press 1998), among others. Within this disclosure, the B2 phase is generally a crystal structure of Cu, Pd, and M atoms. The crystal structure is comprised of alternating first and second layers, where the first layer is generally a plane of Cu atoms and where the second layer is generally a plane of Pd and M atoms. The first and second layers lie along the [100] direction of the crystal structure, where [100] denotes a direction vector in real space.

Within this disclosure, the term "retentate side" means a side of the of the $H_2$ separation membrane in fluid contact with a gaseous mixture reservoir. Similarly, the term "permeate side" means a second side of the $H_2$ separation membrane separated from the gaseous mixture reservoir by the retentate side. As is understood, in operation, $H_2$ transports from the gaseous mixture reservoir through the $H_2$ separation membrane by dissociating on the retentate side, diffusing through the $H_2$ separation membrane as H atoms, and recombining on the permeate side.

Within this disclosure, the term "atomic percent" means the percentage of one kind of atom in the $Cu_{(100-x-y)}Pd_xM_y$ alloy comprising the $H_2$ separation membrane relative to the total number of atoms in the $Cu_{(100-x-y)}Pd_xM_y$ alloy comprising the $H_2$ separation membrane.

Within this disclosure, chemical symbols are based on the International Union of Pure and Applied Chemistry (IUPAC) systematic names. For example, the symbols Cu, Pd, Mg, Y, Al, Ti, and La correspond to Copper, Palladium, Magnesium, Yttrium, Aluminum, Titanium, and Lanthanum, respectively.

Figure 2:
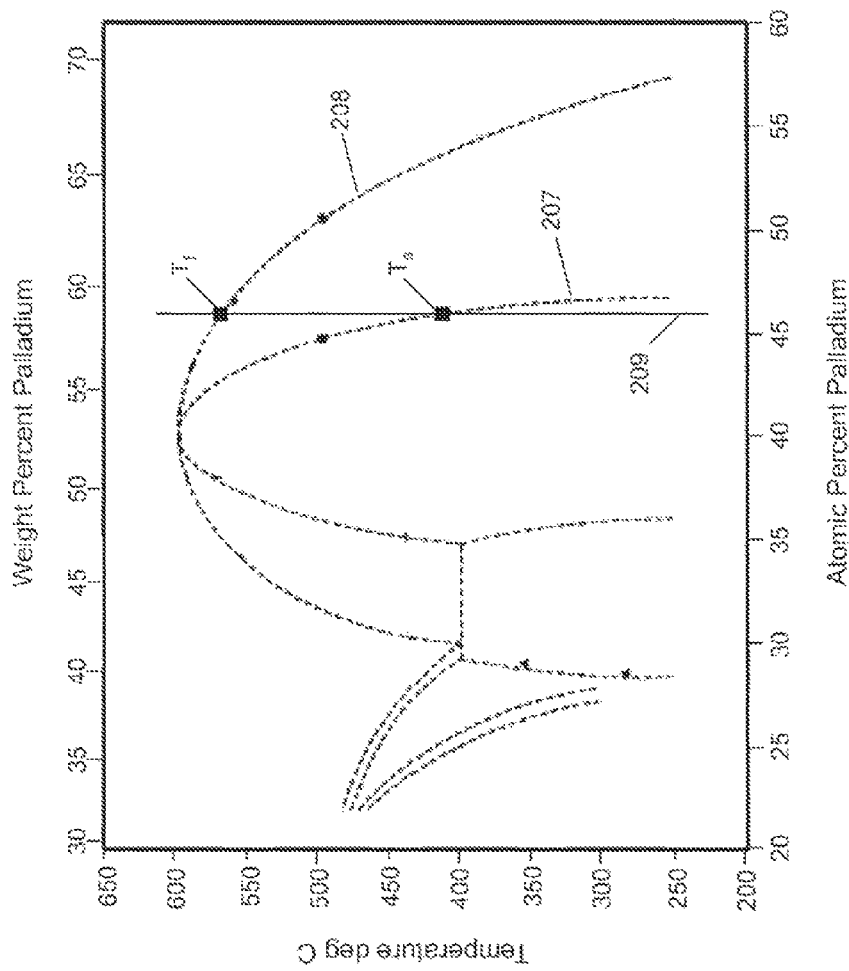
FIG. 2 illustrates the ordered phase boundaries of Cu—Pd alloys as a function of % Pd and temperature.
Figure 3:
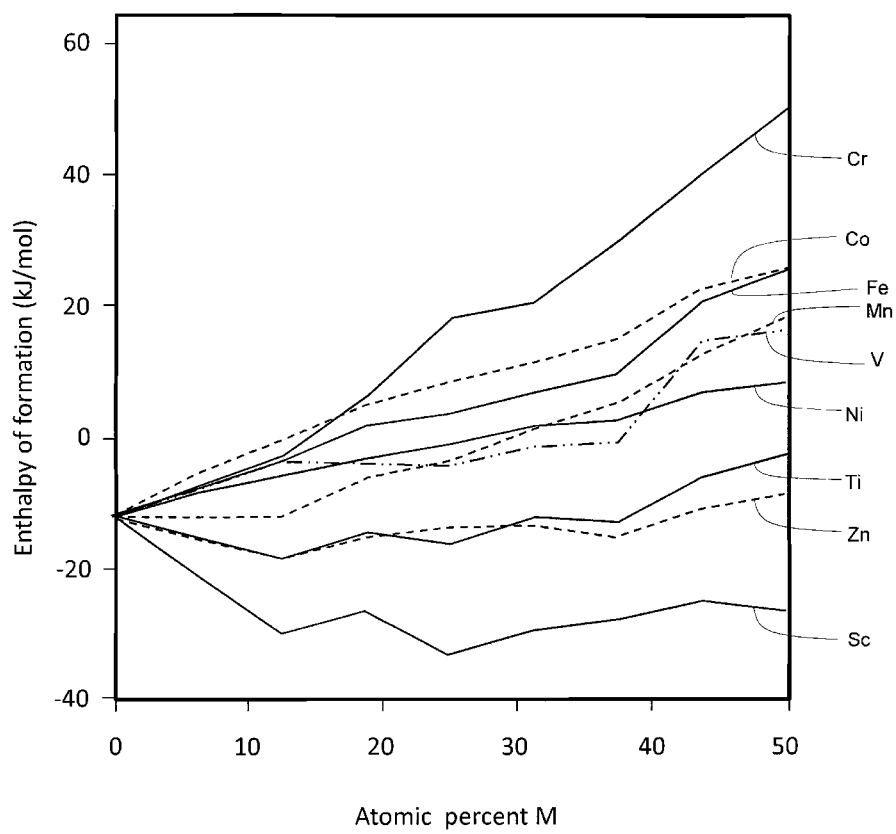
FIG. 3 illustrates DFT results for enthalpies of formation for a first set of evaluated phase stabilizers M.
Figure 4:
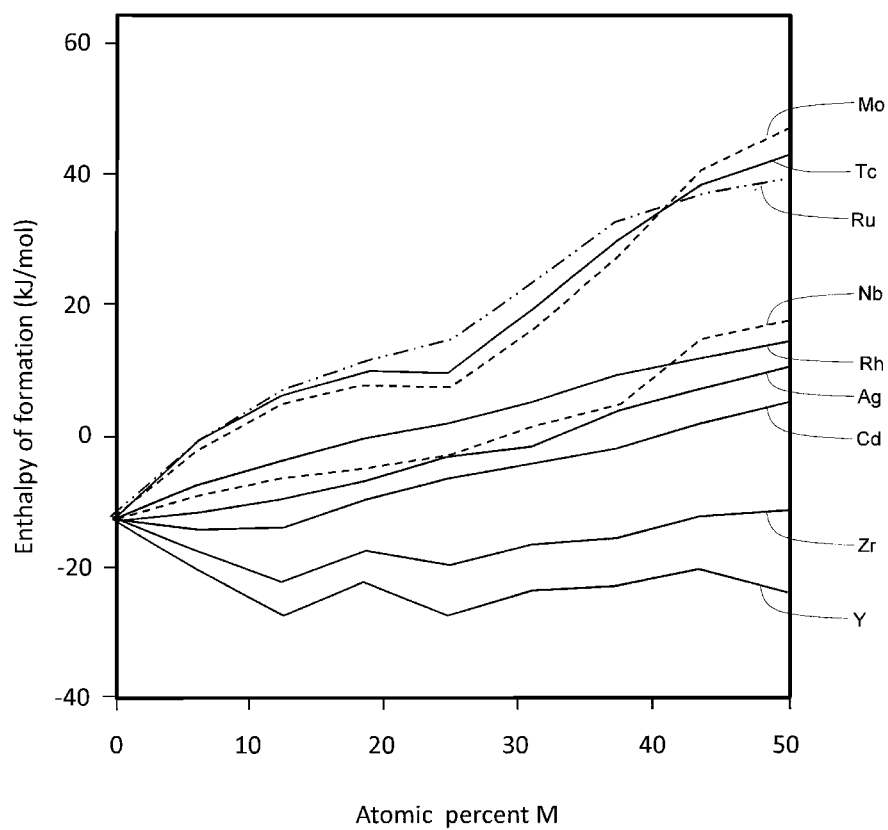
FIG. 4 illustrates DFT results for enthalpies of formation for a second set of evaluated phase stabilizers M.
Figure 5:
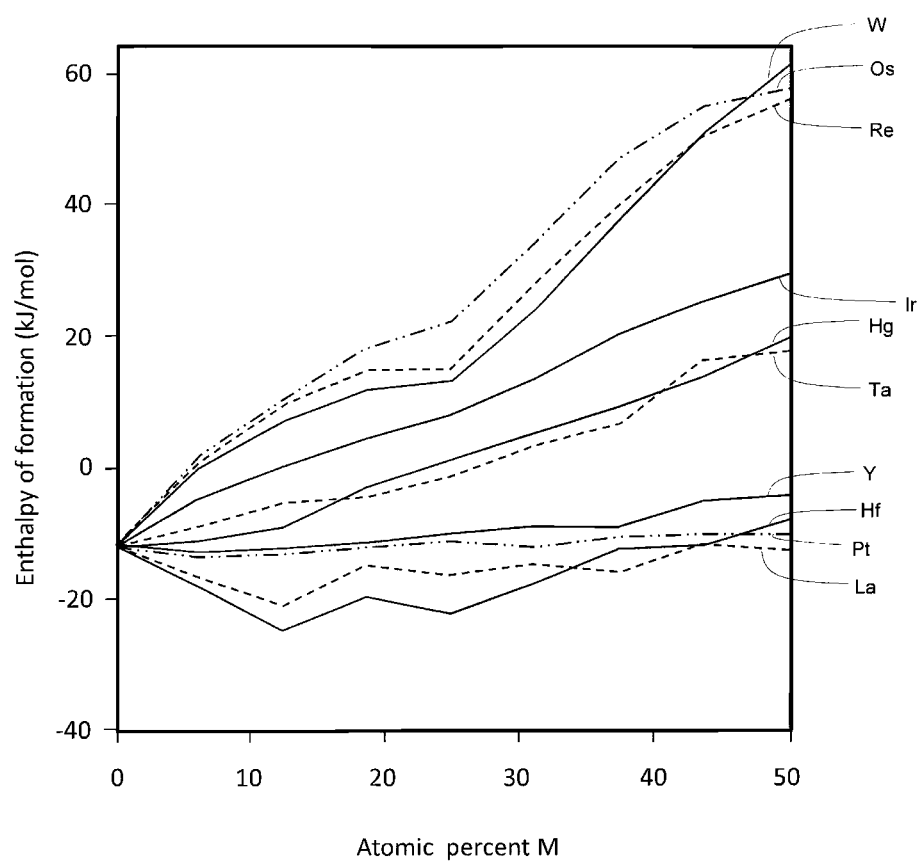
FIG. 5 illustrates DFT results for enthalpies of formation for a third set of evaluated phase stabilizers M.
Figure 6:
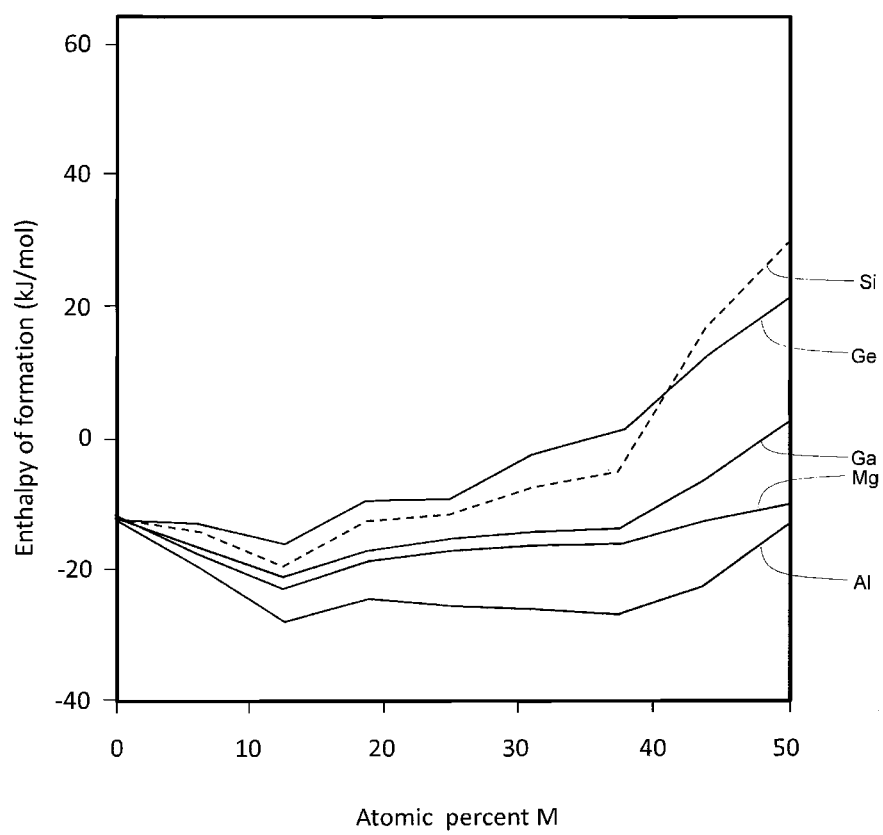
FIG. 6 illustrates DFT results for enthalpies of formation for a fourth set of evaluated phase stabilizers M.

As is understood, alloys consisting of Pd and Cu form homogeneous face centered cubic (fcc) alloys in the whole composition range generally above 600° C. Below that temperature over a range of Pd atomic percents, B2 and fcc phases occur, with B2 as a generally homogenous phase within a narrower range of Pd atomic percents. FIG. 2 generally illustrates the ordered phase boundaries of Cu—Pd alloys as a function of % Pd and temperature, and reflects the B2-fcc behavior. See also Subramanian et al., "Cu—Pd (Copper-Palladium)," *Journal of Phase Equilibria*, Vol 12, No. 2 (1991). At FIG. 2, Cu—Pd alloys possessing % Pd and temperature characteristics falling within boundary 207 exhibit B2 as a generally homogenous phase, while Cu—Pd alloys possessing % Pd and temperature characteristics falling outside boundary 208 exhibit fcc as a generally homogenous phase. Between boundaries 207 and 208, Cu—Pd alloys exhibit a mixture of B2 and fcc phases. As is understood, this phase behavior can be problematic when $H_2$ separation membranes comprised of a Cu—Pd alloy are temperature cycled during the course of fabrication or typical operation. See e.g., Goldbach et al., among others.

As an example, a particular Cu—Pd alloy comprised of approximately 47 atomic % Pd is known to possess a relatively high $H_2$ permeability and is depicted at FIG. 2 as composition 209. As indicated, the alloy is expected to exhibit a homogenous B2 phase below a temperature $T_s$ and a homogenous fcc phase above a temperature $T_f$, with a mixture of B2 and fcc phases within the miscibility gap between $T_s$ and $T_f$. When the alloy is utilized as a $H_2$ separation membrane and typical operations exceed the temperature $T_f$, the fcc phase of the alloy incurs the negative aspects of the fcc phase relative to the B2 phase as discussed earlier. Additionally, repeated cycling over the two phase region between $T_s$ and $T_f$ can tend to generate stoichiometric heterogeneity and an increased propensity for defect formation during the fcc-B2 phase transformations. Further, such phase transformation may present issues arising after fabrication of the $H_2$ separation membrane, as altered lattice parameters between the two phases impacts the effectiveness of tight, as-constructed mechanical tolerances between, for example, the membrane and a surrounding support.

The disclosure herein provides a ternary alloy comprised of Cu, Pd, and a phase stabilizer M which acts to increase the temperatures $T_s$ and $T_f$ at FIG. 2 for a given Pd at. %. The alloy has the composition $Cu_{(100-x-y)}Pd_xM_y$, where the phase stabilizer M consists of magnesium, yttrium, aluminum, titanium, lanthanum, or combinations thereof, and where x is from about 35 to about 50 atomic percent, and y is greater than 0 and less than about 20 atomic percent. Due to the phase stabilization and the greater temperature range over which a B2 phase can be maintained, the alloy is well suited for service as a $H_2$ separation membrane, particularly when applicable conditions are established or cycled above about 600° C. over the course of expected operations. For example, where the $H_2$ separation membrane is utilized for $H_2$ separation on a gaseous stream generated through coal gasification, where applicable conditions may dictate temperatures as high as 900° C.

Table 1 illustrates the impact of the phase stabilizer M on certain embodiments of the $Cu_{(100-x-y)}Pd_xM_y$ alloy where x=43.75 at. % and y=6.25 at. %, and where the approximate parameters $T_s$ and $T_f$ are analogous to the representations at FIG. 2.

Proof of Principle

The ternary Cu—Pd-M alloys were developed through the use of first principles density functional theory to initially screen for potential alloying elements M that would stabilize the B2 structure followed by subsequent experimentation and evaluation for validation of the predictions. The initial computational work indicated potential B2 phase stabilization for the alloying elements M for elements Sc, Ti, Zn, Y, Hf, La, Al, and Mg. Of these potential B2 phase stabilizers, subsequent experimental validation indicated an actual stabilization with alloying elements M of Mg, Y, Al, Tl, and La.

The first principles package of VASP (Vienna ab initio simulation package) was used to calculate the total energies using electronic density functional theory (DFT). See Kresse et al., "Ab. initio molecular dynamics for liquid metals," *Phys. Rev. B*, Vol. 47 (1993); see also Kresse et al., "Efficient iterative schemes for ab initio total-energy," Phys. Rev. B, Vol. 54 (1996). Projector augmented-wave (PAW) potentials were used as supplied with VASP. See Blochl "Projector augmented-wave method," *Phys. Rev. B, Vol.* 50 (1994). The Perdew-Burke-Ernzerhof gradient approximation to the exchange correlation functional was used. See Perdew et al., "Generalized Gradient Approximation Made Simple," *Phys. Rev. Lett.*, Vol. 78 (1997). The Brillouin zone integrations were performed using the Monkhorst-Pack k-point meshes, and a smearing parameter of 0.2 eV was chosen for the Methfessel-Paxton technique. See Monkhorst et al. "Special Points for Brillouin-zone integrations," *Phys. Rev. B*, Vol. 13 (1976), and see Methfessel et al., "High-precision sampling for Brillouin-zone integration in metals," *Phys. Rev. B*, Vol. 40 (1989). All structures are fully relaxed (both lattice parameters and atomic coordinates) until energies converge to a precision of 1 meV/at. A "high precision" setting is used. The plane-wave energy cutoff is held constant at 500 eV. The semi-core 3p, 4p and 5p electrons of transition metal elements are explicitly treated as valence. To obtain enthalpy of formation values $\Delta H_f$, a composition-weighted average of the pure elemental cohesive energies is subtracted from the cohesive energy of a given composition. The resulting energy is an "enthalpy" because its volume is relaxed at zero pressure. A 2×2×2 supercell was built and individual Pd atom was substituted by the alloying elements.

In order to identify possible strong stabilizers from among selected metals, OFT was conducted for B2 $Cu_8Pd_{8-x}M_x$ (x=0-8) ternary alloys. Resulting enthalpies of formation are illustrated at FIGS. 3-6 for the 34 metals evaluated. At FIGS. 3-6, solid and dashed lines are utilized for the purpose of clarity only. Negative enthalpies of formation as illustrated at FIGS. 3-6 indicated potential energetic stability for the B2 phase when elements Sc, Ti, Zn, Y, Zr, Hf, La, Al and Mg are utilized in the $Cu_8Pd_{8-x}M_x$ alloys. The results ignore any competing phases in the individual ternaries, and ignore any configurational entropy effect and lattice vibration at finite temperatures.

Based on the present OFT calculations, 7 alloying elements (Ti, Zr, Hf, Y, La, Al and Mg) were selected for experimental verification using nominal compositions of $Cu_{50}Pd_{43.75}M_{6.25}$ and $Cu_{66}Pd_{27.75}M_{6.25}$. The alloys were fabricated using high purity Cu, Pd, Ti, Zr, Hf, Y, La, Al and Mg elements in pellet or sponge form. The chosen Pd-rich compositions were the same as the OFT calculations for consistency. The Cu-rich compositions were chosen for the purpose of locating the B2 phase on the Cu-rich side. The 16 alloys were prepared by melting in a vacuum arc furnace back-filled with high purity argon. Each sample weighted ~40 g. For evaluation purposes, the alloys were homogenized at 900° C. for 72 hours and subjected to an equilibration annealing at 400° C. for 21 days.

Chemical analysis of the homogenized and annealed alloys was conducted using wavelength dispersive x-ray fluorescence spectroscopy (WDXRF) (Rigaku, ZSX Primus II) with results at Table 2. Cu—Zn alloys were used for calibrating the WDXRF. The phase identification was done using x-ray diffraction (XRD) (Rigaku, Ultima III with Jade analysis software). Optical microscopy and scanning electron microscopy/energy dispersive spectroscopy (SEM/EDS) (FEI, Inspect F50 scanning electron microscope with Oxford INCA Microanalysis) were used for microstructural characterization and microchemical analysis. The high temperature differential scanning calorimeter (DSC) apparatus (Setaram Setsys 16/18) was used to determine the B2 ↔ fcc phase transition temperatures for these alloys. The measurements were conducted between room temperature and 1000° C. with a heating and cooling rate of 10K/min in an argon atmosphere.

The estimated volume percentage of the B2 phase in the $Cu_{(100-x-y)}Pd_xM_y$ alloys may be estimated using back-scattered SEM images and analysis of the compositional contrast using appropriate software, such as IMAGEJ. The estimated volume percentage may additionally be estimated based on integration of the XRD trace over the B2 phase 2-theta range as compared to an integration over the 2-theta range of the sample. See e.g., Chung et al., *Industrial Applications of X-ray Diffraction*, Marcel Decker, Inc., New York, N.Y. (2000), pp. 55-88. For the ternary $Cu_{50}Pd_{43.75}M_{6.25}$ alloys tested, M=Mg, Y, and Al were the strongest B2 stabilizers, producing B2 phase estimated volume percentages of 100%, 75%, and 70% respectively at 400° C.

High-temperature x-ray diffraction (HT-XRD) was performed to determine the temperature limits of the B2 phase in each ternary $Cu_{50}Pd_{43.75}M_{6.25}$ alloy, where M=Mg, Y, Al, Ti, La, Zr, and Hf. The HT-XRD was conducted at a baseline temperature of 25° C. and additionally at temperatures generally between 500° C. and 950° C. for each alloy, in order to validate potential B2 phase stabilizing effects at temperatures greater than 600° C. The samples were held for 1 hour at each temperature increment before the x-ray scan to insure equilibration. The HT-XRD indicated phase stabilization occurred when Mg, Y, Al, Ti, La were utilized as alloying elements, while the alloying elements Zr and Hf failed to produce significant phase stabilization. The HT-XRD results are presented with intensity at the applicable 2-theta and respective temperatures indicated. 2-theta values indicating B2(100), B2(110), B2(111), FCC(111), and FCC(200) crystalline structures are illustrated where applicable.

As will be discussed, FIGS. 7-21 illustrate stabilization of the B2 phase for specific elements M in the $Cu_{(100-x-y)}Pd_xM_y$ alloy based on the highest temperature at which a B2 phase peak is generally detected. The maximum temperature at which the B2 phase peak is detected is treated as the B24 ↔ fcc phase transition temperature for the alloy represented. As indicated, the alloys evaluated and represented at FIGS. 7-21 can be generally expressed in the nomenclature of the disclosure as $Cu_{50}Pd_{43.75}M_{6.25}$, and extension of the B2 phase stabilization to increased temperatures can be recognized through comparison to the B24 ↔ fcc phase transition temperature of a $Cu_{50}Pd_{50}$ alloy, which is approximately 500° C.

Results

Figure 7:
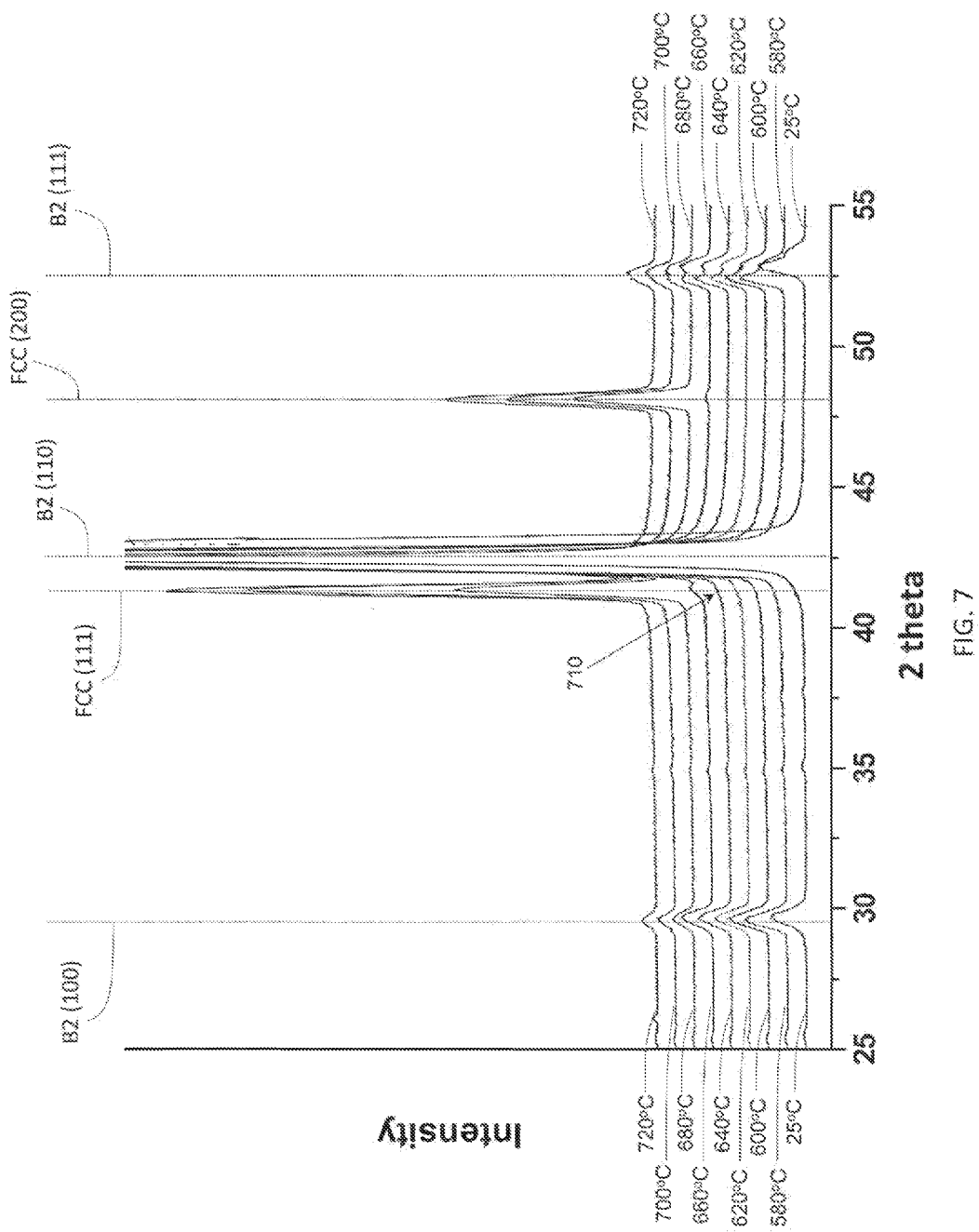
FIG. 7 illustrates HT-XRD results for a $Cu_{50}Pd_{43.75}Mg_{6.25}$ alloy over a temperature range from 25° C. to 720° C.
Figure 8:
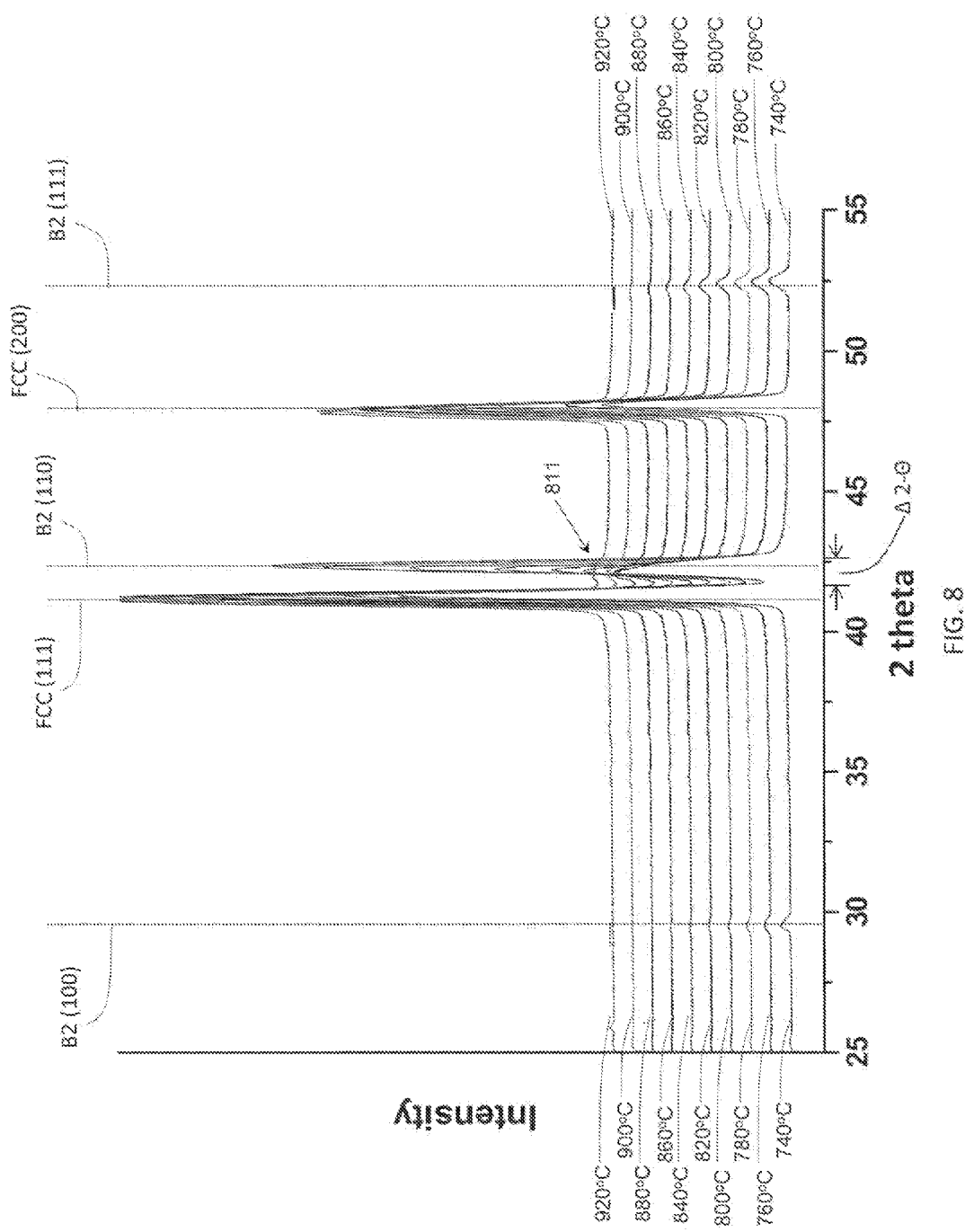
FIG. 8 illustrates HT-XRD results for a $Cu_{50}Pd_{43.75}Mg_{6.25}$ alloy over a temperature range from 740° C. to 920° C.
Figure 9:
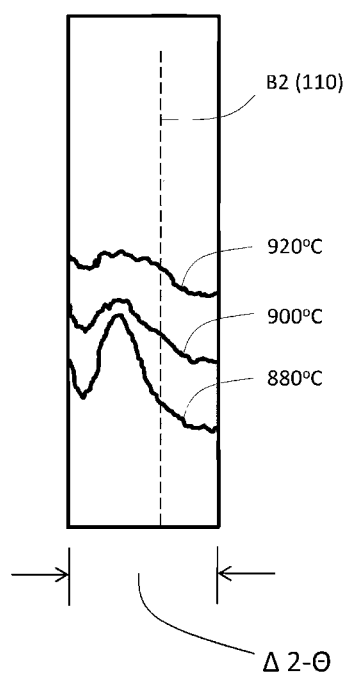
FIG. 9 further illustrates HT-XRD results for a $Cu_{50}Pd_{43.75}Mg_{6.25}$ alloy over a temperature range from 880° C. to 920° C.

For the $Cu_{50}Pd_{43.75}Mg_{6.25}$ alloy, HT-XRD indicated a single phase of a B2 crystal structure (B2(110)) at room temperature (25° C.) and persisting as temperatures increase, as indicated at FIG. 7. The first indication of the face centered cubic (FCC(111)) phase appears at 640° C., as generally indicated at 710. Above 640° C., the volume fraction of the fcc phase increases as the temperature increases, as evidenced by a growing intensity of fcc peaks (FCC(111) and FCC(200)) at the expense of B2 peaks. At FIG. 8, eventually, all the B2 peaks (B2(110)) disappear completely as the entire specimen transforms to fcc above 920° C., as generally indicated at 811. For further illustration and clarity, the HT-XRD data indicated at 811 at FIG. 8 is magnified at FIG. 9 for temperatures between 880° C. and 920° C., and around the B2 phase (B2(110)) over the Δ 2-Θ range at FIGS. 8 and 9. As indicated at FIG. 9, the B2 phase largely disappears at roughly the 920° C. temperature. Correspondingly, the B2+fcc ↔ fcc phase transition temperature for $Cu_{50}Pd_{43.75}Mg_{6.25}$ alloy is estimated to be 920° C. This is significantly higher than that of a $Cu_{50}Pd_{50}$ alloy, which is approximately 500° C. Furthermore, since the $Cu_{50}Pd_{43.75}Mg_{6.25}$ alloy contained a mixture of B2 and fcc phases at higher temperatures, it is likely that the B2 phase field is also expanded toward the Pd—Mg rich side (i.e. Cu-poor side) due to Mg substitution for Pd. Additionally, since element diffusivity increases exponentially as the temperature increases, it is intuitively expected that $Cu_{50}Pd_{43.75}Mg_{6.25}$ will possess higher hydrogen permeability in the bulk at lower cost. The experimental results also suggest that the B2 phase should exhibit a higher Mg solubility than 6.25 atomic percent.

Figure 10:
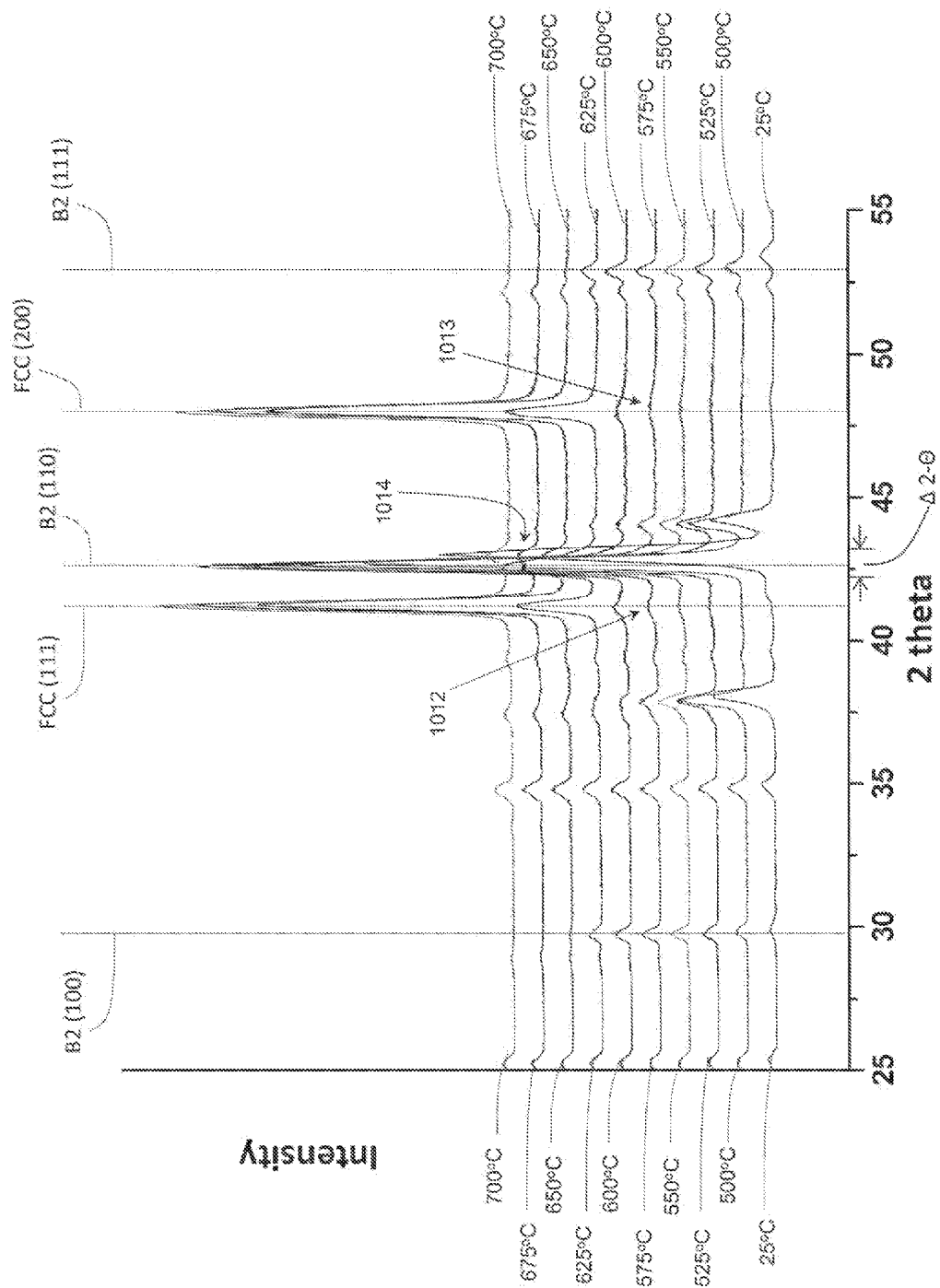
FIG. 10 illustrates HT-XRD results for a $Cu_{50}Pd_{43.75}Y_{6.25}$ alloy over a temperature range from 25° C. to 700° C.
Figure 11:
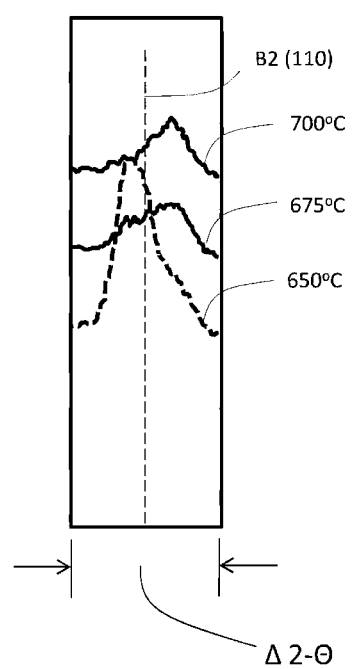
FIG. 11 further illustrates HT-XRD results for a $Cu_{50}Pd_{43.75}Y_{6.25}$ alloy over a temperature range from 650° C. to 700° C.
Figure 12:
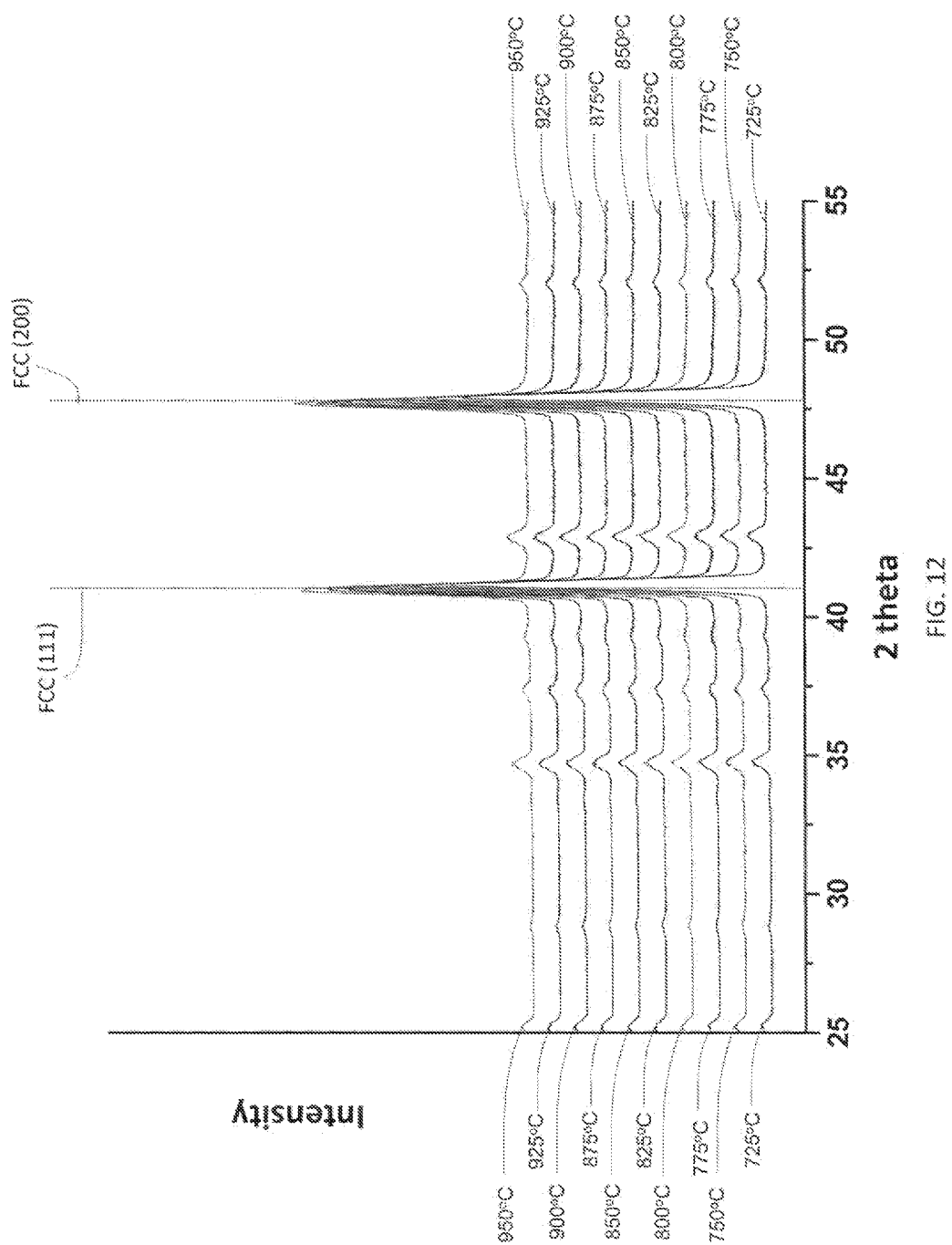
FIG. 12 illustrates HT-XRD results for a $Cu_{50}Pd_{43.75}Y_{6.25}$ alloy over a temperature range from 725° C. to 950° C.

For the $Cu_{50}Pd_{43.75}Y_{6.25}$ alloy at FIGS. 10, 11, and 12, substitution of 6.25 at. % Y for Pd also expands the B2 phase field when compared to the $Cu_{50}Pd_{50}$ alloy. The HT-XRD data in FIG. 10 shows that the major phase in the $Cu_{50}Pd_{43.75}Y_{6.25}$ alloy is B2 (B2(110)) below 625° C. The first indication of the fcc phase (FCC(111) and FCC (200)) at FIG. 10 is apparent at around 575° C., as generally indicated at 1012 and 1013. At 675° C., almost all of the B2 phase (B2(110)) transforms to fcc, as generally indicated at 1014. For further illustration and clarity, the HT-XRD data indicated at 1014 at FIG. 10 is magnified at FIG. 11 for temperatures between 650° C. and 700° C., and around the B2 phase (B2(110)) over the Δ 2-Θ range at FIGS. 10 and 11. As indicated at FIG. 10, the B2 phase largely disappears at roughly the 675° C. temperature. This is further evidenced by the relative absence of B2 phase at the increasing temperatures of FIG. 12. This data suggest that the B2 phase field is expanded toward the $Pd_{50-x}Y_x$ side of the Cu—Pd—Y system as x increases to the solubility limit. Furthermore, the B2+fcc ↔ fcc phase transition temperature for $Cu_{50}Pd_{43.75}Y_{6.25}$ alloy is approximately 675° C. Phases of $Pd_3Y$ and $Y_2O_3$ were also identified in the $Cu_{50}Pd_{43.75}Y_{6.25}$ alloy and appear as peaks, but are not specifically identified at FIGS. 10, 11 and 12 for clarity.

Additionally, In order to examine the reactivity of the third addition element to the PdCu membrane alloys in oxidizing $H_2S$-containing syngas environments, DFT calculations were performed to predict the surface structure and corresponding surface energies of the B2 $Cu_8Pd_7M$ alloy. Although elemental Y is vulnerable to oxidation and reaction with $H_2S$ gas molecules, the DFT calculations on the surface segregation energy of $Cu_8Pd_7Y$ show that Y atoms will migrate away from the surface positions into the bulk. This finding is significant because it suggests that $Cu_8Pd_7Y$ surfaces should retain the excellent hydrogen selectivity of PdCu surfaces and the tendency to form surface $Y_2O_3$ should not be a concern.

Figure 13:
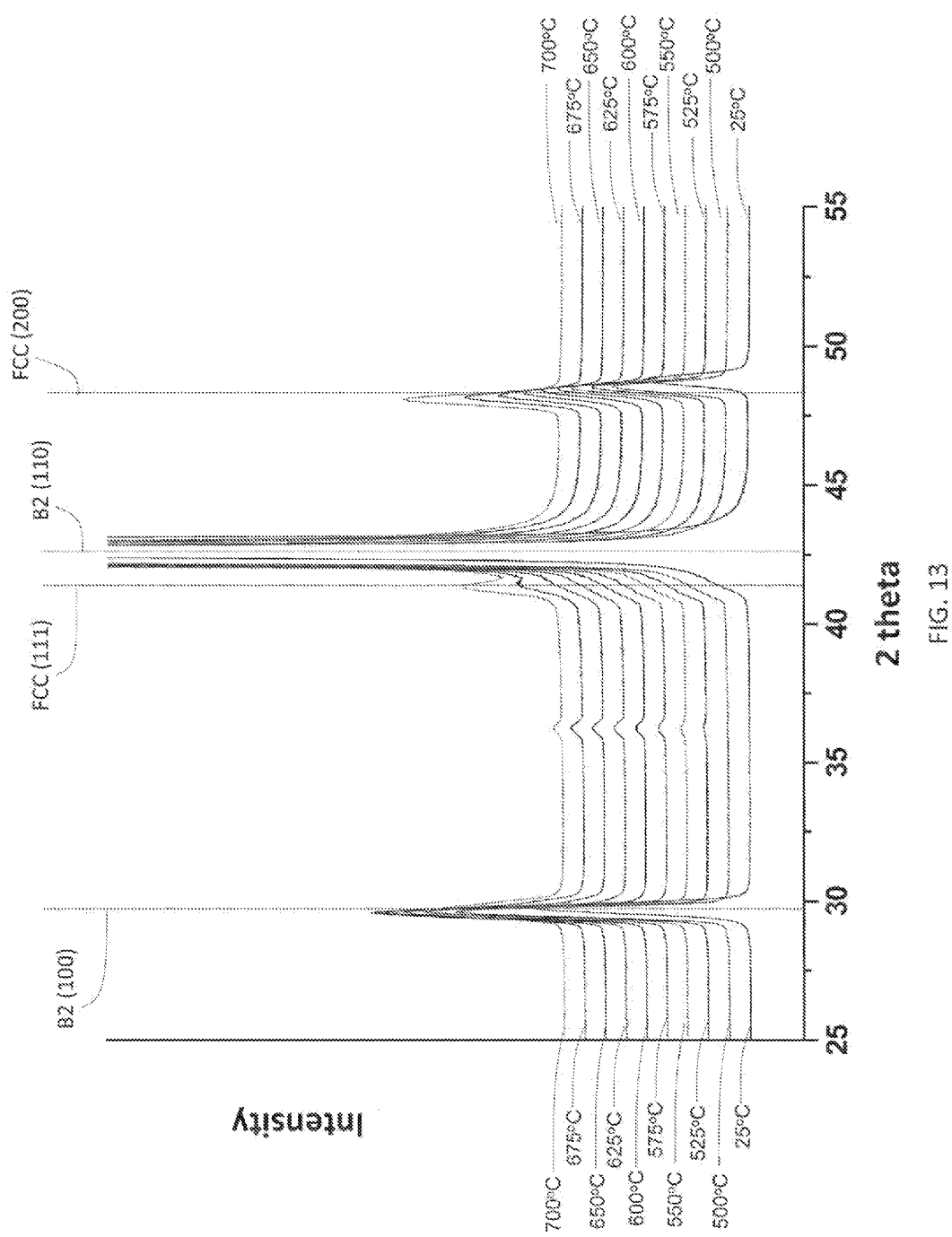
FIG. 13 illustrates HT-XRD results for a $Cu_{50}Pd_{43.75}Al_{6.25}$ alloy over a temperature range from 25° C. to 700° C.
Figure 14:
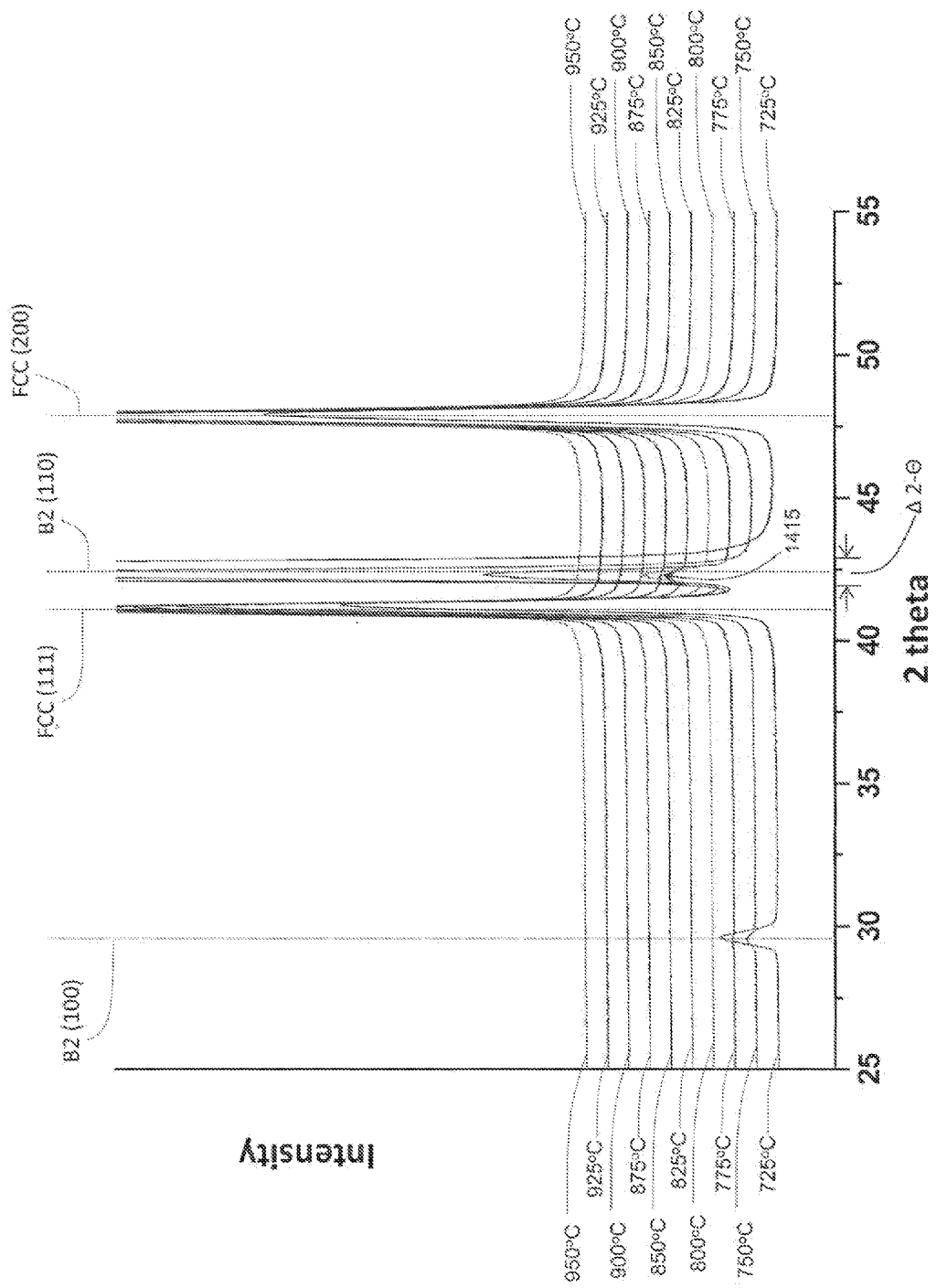
FIG. 14 illustrates HT-XRD results for a $Cu_{50}Pd_{43.75}Al_{6.25}$ alloy over a temperature range from 725° C. to 950° C.
Figure 15:
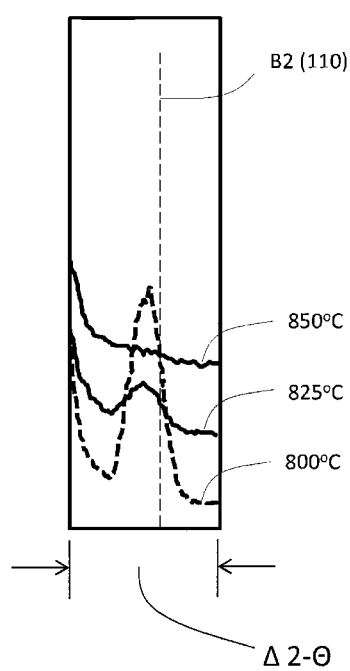
FIG. 15 further illustrates HT-XRD results for a $Cu_{50}Pd_{43.75}Al_{6.25}$ alloy over a temperature range from 800° C. to 850° C.

For the $Cu_{50}Pd_{43.75}Al_{6.25}$ alloy at FIGS. 13, 14 and 15, substitution of 6.25 at. % Al for Pd expands the B2 phase field when compared to the $Cu_{50}Pd_{50}$ alloy. At FIG. 13, the B2 phase (BCC(110)) is evident at 25° C. and at increasing temperatures, and the volume fraction of the fcc phase (FCC (111) and FCC(200)) increase gradually with temperature. The behavior continues as temperature is further increased at FIG. 14, with the $Cu_{50}Pd_{43.75}Al_{6.25}$ becoming completely fcc above 825° C., as generally indicated by the disappearance of the B2 phase (B2(110)) at 1415. For further illustration and clarity, the HT-XRD data generally indicated at 1415 at FIG. 14 is magnified at FIG. 15 for temperatures between 800° C. and 850° C., and around the B2 phase (B2(110)) over the Δ 2-Θ range at FIGS. 14 and 15. As indicated at FIG. 15, the B2 phase largely disappears at roughly the 825° C. temperature. This data suggest that the B2 phase field is expanded toward the $Pd_{50-x}Al_x$ side of the Cu—Pd—Al system as x increases to the solubility limit. Furthermore, the B24 ↔ fcc phase transition temperature for $Cu_{50}Pd_{43.75}Al_{6.25}$ alloy is also raised to a temperature above 825° C. $Cu_2O$ was also identified in the $Cu_{50}Pd_{43.75}Al_{6.25}$ alloy and appear as peaks, but are not specifically identified at FIGS. 13, 14, and 15 for clarity. Additionally, In order to examine the reactivity of the addition of Al to the PdCu membrane alloys in oxidizing $H_2S$-containing syngas environments, DFT calculations were performed to predict the surface structure and corresponding surface energies of the B2 $Cu_{50}Pd_{43.75}Al_{6.25}$ alloy. Although elemental Al is vulnerable to oxidation and reaction with $H_2S$ gas molecules, the DFT calculations on the surface segregation energy of Al on CuPd show that Al atoms will migrate away from the surface positions into sub-surface positions. This finding is significant because it suggests that $Cu_{50}Pd_{43.75}Al_{6.25}$ surfaces should retain the excellent hydrogen selectivity of PdCu surfaces and the tendency to form surface $Al_2O_3$ should not be a concern.

Figure 16:
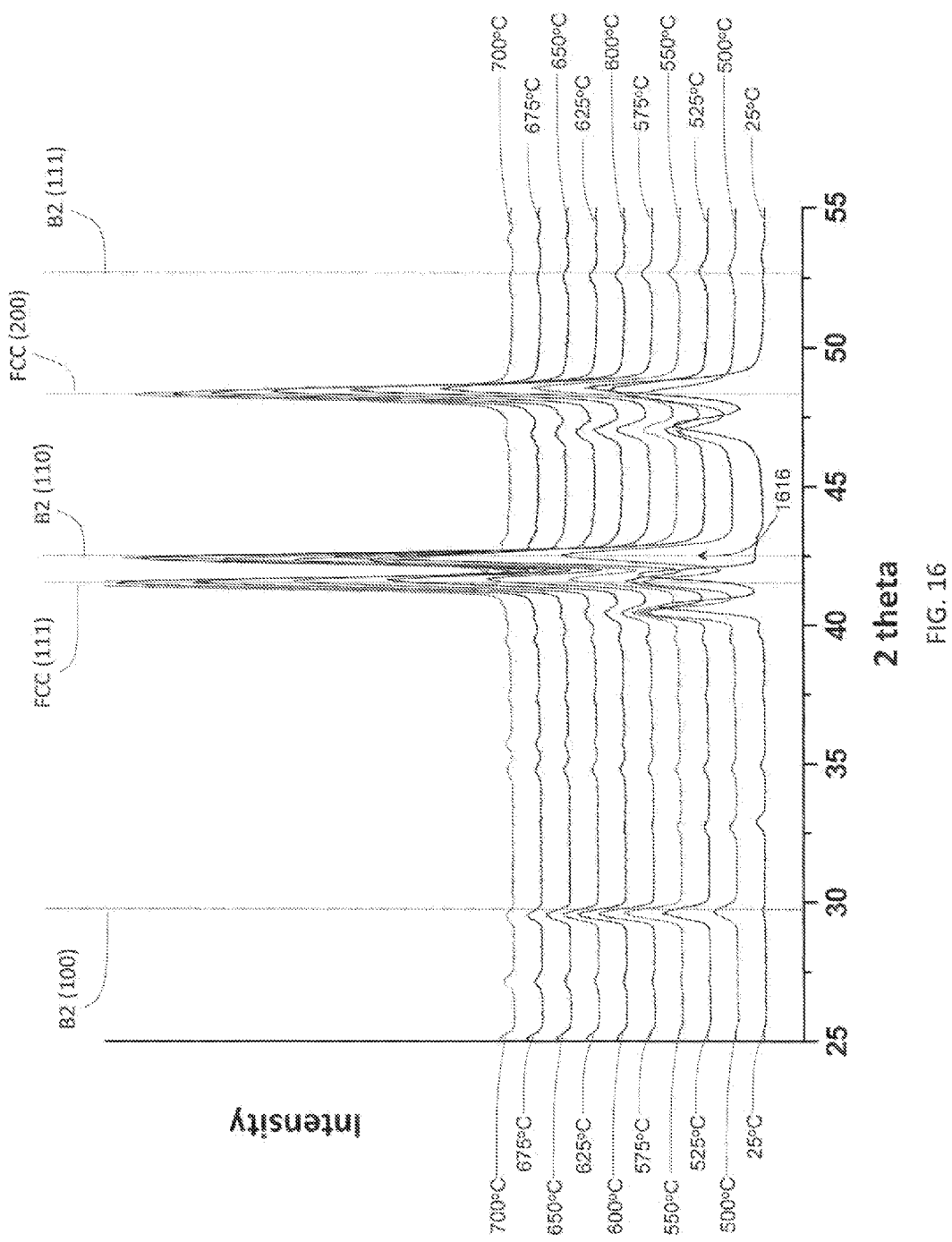
FIG. 16 illustrates HT-XRD results for a $Cu_{50}Pd_{43.75}Ti_{6.25}$ alloy over a temperature range from 25° C. to 700° C.
Figure 17:
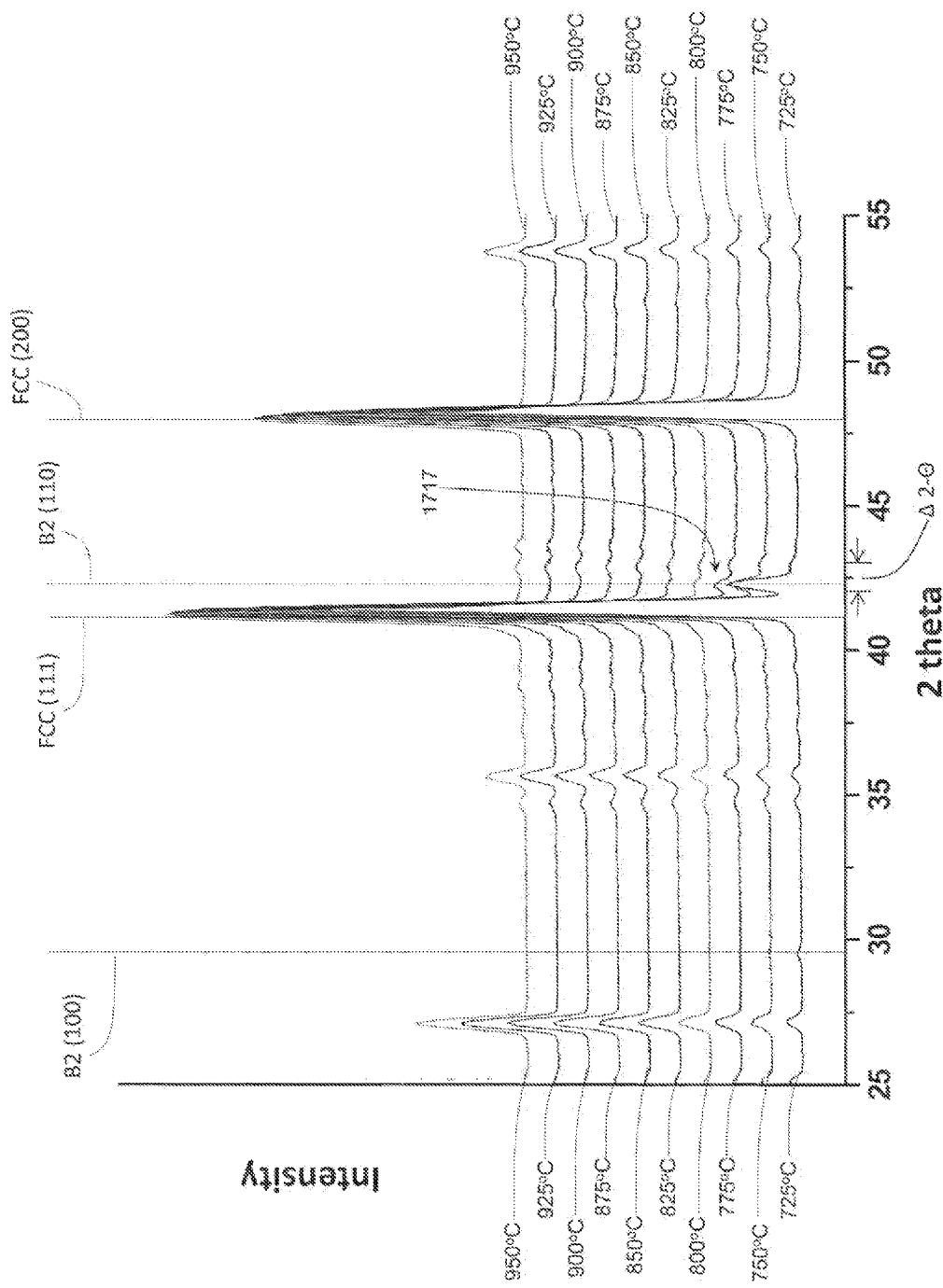
FIG. 17 illustrates HT-XRD results for a $Cu_{50}Pd_{43.75}Ti_{6.25}$ alloy over a temperature range from 725° C. to 950° C.
Figure 18:
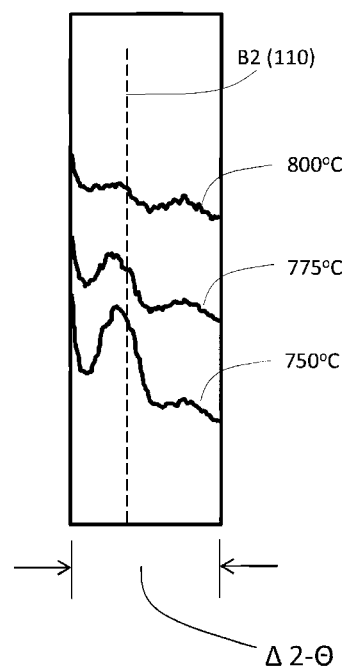
FIG. 18 further illustrates HT-XRD results for a $Cu_{50}Pd_{43.75}Ti_{6.25}$ alloy over a temperature range from 750° C. to 800° C.

For the $Cu_{50}Pd_{43.75}Ti_{6.25}$ alloy at FIGS. 16, 17, and 18, substitution of 6.25 at. % percent Ti for Pd expands the B2 phase field when compared to the $Cu_{50}Pd_{50}$ alloy. At FIG. 16, the B2 phase (BCC(110)) is evident as indicated generally at 1616. As temperatures increase, the volume fraction of the fcc phase (FCC(111) and FCC(200)) gradually increase. As temperature is further increased at FIG. 17, above 775° C. and as indicated generally at 1717, the alloy becomes completely fcc. For further illustration and clarity, the HT-XRD data indicated at 1717 at FIG. 17 is magnified at FIG. 18 for temperatures between 750° C. and 800° C., and around the B2 phase (B2(110)) over the Δ 2-Θ range at FIGS. 17 and 18. As indicated at FIG. 18, the B2 phase largely disappears at roughly the 775° C. temperature. This data suggest that the B2 phase field is expanded toward the $Pd_{50-x}Ti_x$ side of the Cu—Pd—Ti system as x increases to the solubility limit. Furthermore, the B24 ↔ fcc phase transition temperature for the $Cu_{50}Pd_{43.75}Ti_{6.25}$ alloy is also raised to a temperature above 775° C. Phases of $TiO_2$ and $Pd_3Ti$ were also identified in the $Cu_{50}Pd_{43.75}Ti_{6.25}$ alloy and appear as peaks, but are not specifically identified at FIGS. 16, 17, and 18 for clarity.

Figure 19:
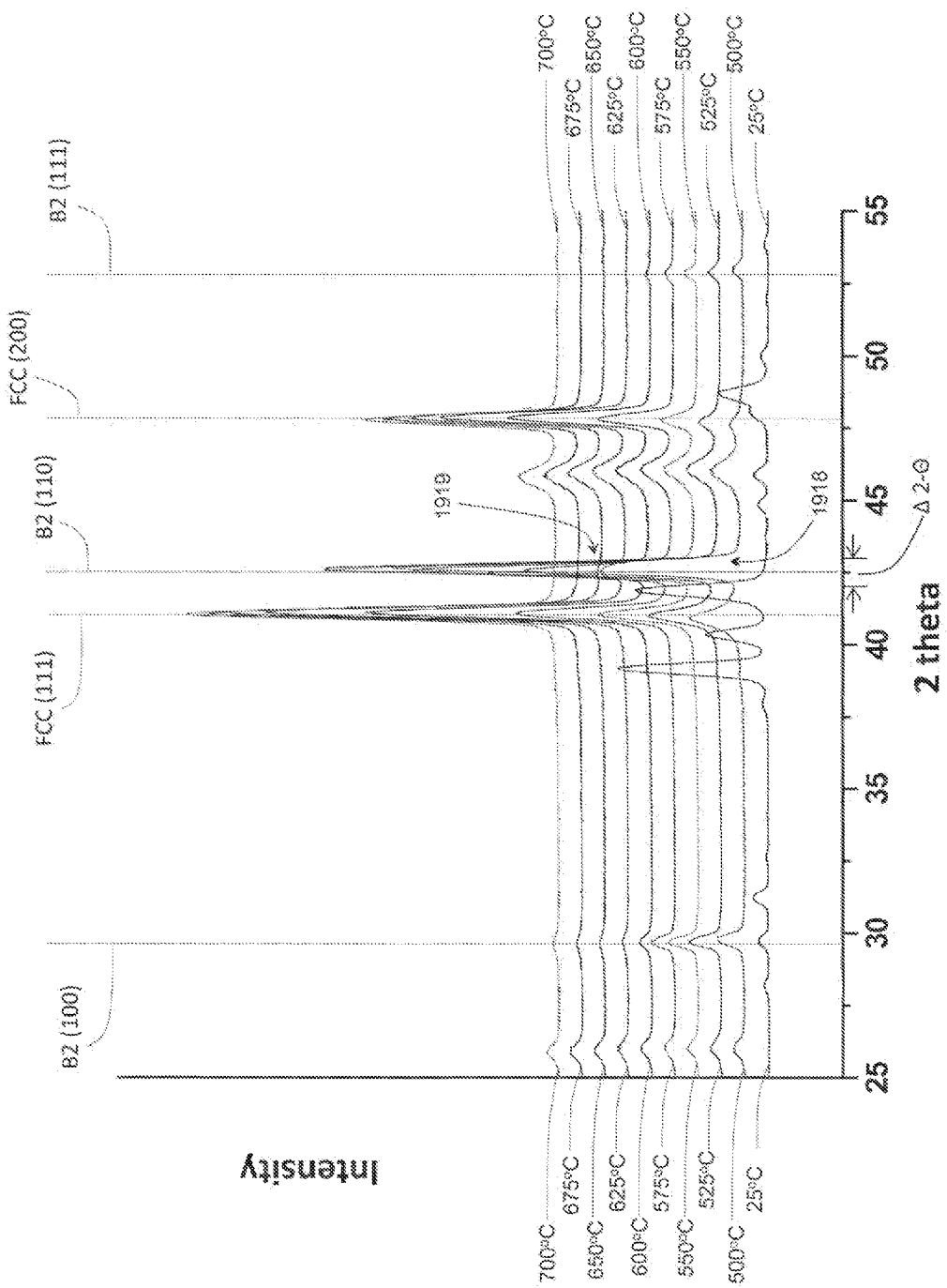
FIG. 19 illustrates HT-XRD results for a $Cu_{50}Pd_{43.75}La_{6.25}$ alloy over a temperature range from 25° C. to 700° C.
Figure 20:
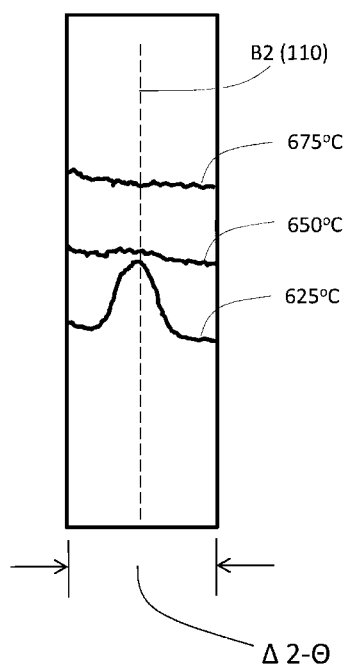
FIG. 20 illustrates HT-XRD results for a $Cu_{50}Pd_{43.75}La_{6.25}$ alloy over a temperature range from 625° C. to 675° C.
Figure 21:
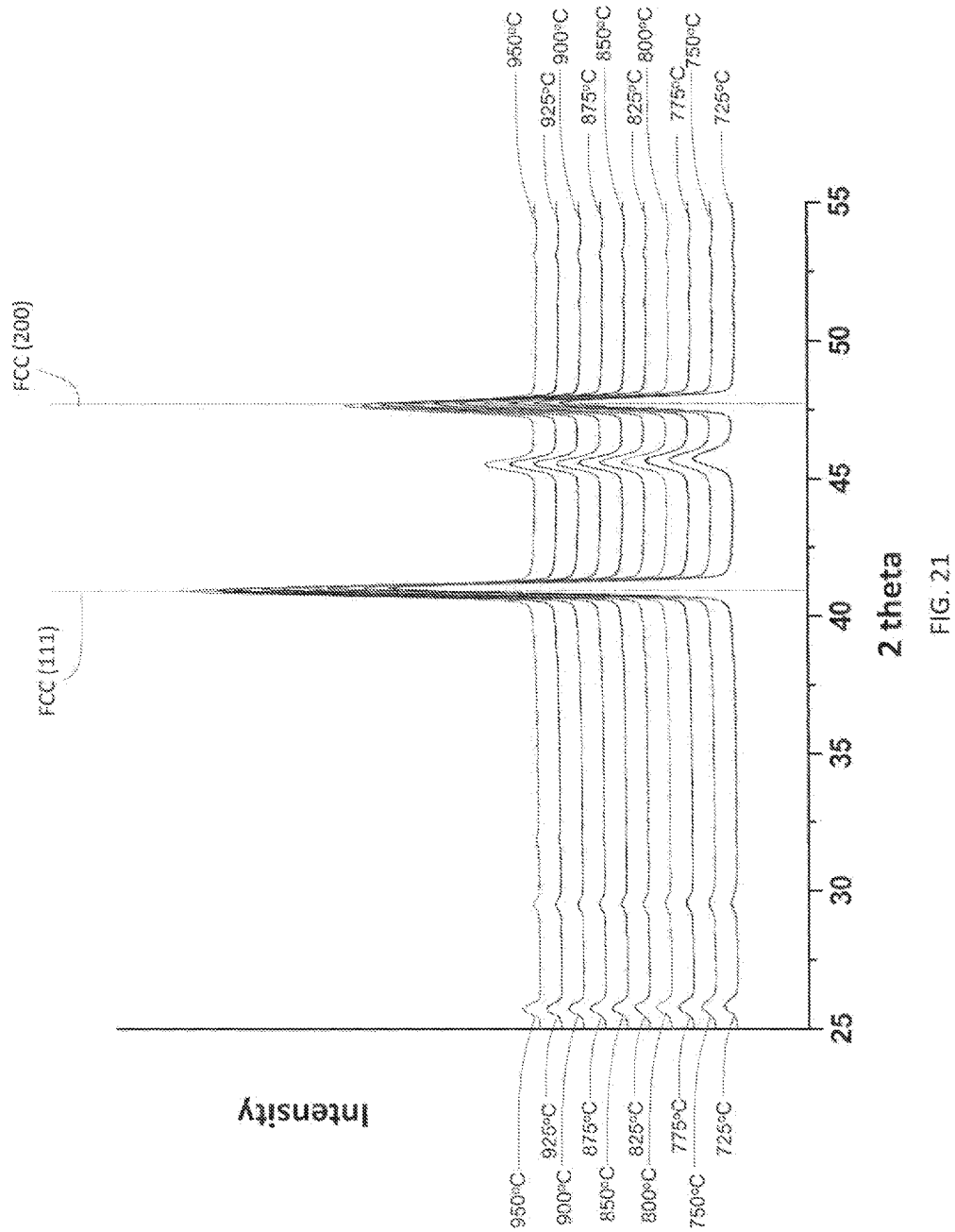
FIG. 21 illustrates HT-XRD results for a $Cu_{50}Pd_{43.75}La_{6.25}$ alloy over a temperature range from 725° C. to 950° C.

For the $Cu_{50}Pd_{43.75}La_{6.25}$ alloy at FIGS. 19, 20 and 21, substitution of 6.25 at. % percent La for Pd expands the B2 phase field when compared to the $Cu_{50}Pd_{50}$ alloy. At FIG. 19, the B2 phase (BCC(110)) is evident as indicated generally at 1918. As temperatures increase, the volume fraction of the fcc phase (FCC(111) and FCC(200)) gradually increase. As temperature is further increased above 650° C. and as indicated generally at 1919, the alloy becomes completely fcc. For further illustration and clarity, the HT-XRD data indicated at 1919 at FIG. 19 is magnified at FIG. 20 for temperatures between 625° C. and 675° C., and around the B2 phase (B2(110)) over the Δ 2-Θ range at FIGS. 19 and 20. As indicated at FIG. 20, the B2 phase largely disappears at roughly the 650° C. temperature. This is further evidenced by the relative absence of B2 phase at the increasing temperatures of FIG. 21. This data suggest that the B2 phase field is expanded toward the $Pd_{50-x}La_x$ side of the Cu—Pd—La system as x increases to the solubility limit. Furthermore, the B2 ↔ fcc phase transition temperature for the $Cu_{50}Pd_{43.75}La_{6.25}$ alloy is also raised to a temperature above 650° C.

Based on the DFT calculations and experimental results of various $Cu_{(100-x-y)}Pd_xM_y$ alloys, where x is from about 35 to about 50 at. % and y is greater than 0 and less than about 20 at. %, 5 alloying elements corresponding to M=Mg, Y, Al, Ti, and La are identified which can greatly improve hydrogen separation performance at much lower cost compared to pure Pd or Pd—Cu binary membrane alloys. In an embodiment where M=Y, Ti, La or combinations thereof, the alloy is comprised of from greater than 0 to about 10 at. % M. The compositional ranges have great potential in reducing Pd contents, expanding the B2 phase field towards higher temperatures, achieving higher hydrogen permeability at higher temperatures, and achieving improved resistance against sulfur poisoning, among other advantages.

Referring to FIG. 1 and as discussed supra, FIG. 1 illustrates $H_2$ separation apparatus 100 comprised of $H_2$ separation membrane 101, with retentate side 102 in fluid communication with gaseous mixture reservoir 104. $H_2$ separation membrane 101 is comprised of the ternary alloy $Cu_{(100-x-y)}Pd_xM_y$, as disclosed and in operation separates $H_2$ from a gaseous mixture contained by gaseous mixture reservoir 104. In the alloy formulation, elements of Mg, Y, Al, Ti, and La act as strong stabilizers for the B2 phase of the alloy, and extend the critical temperature of the alloy for a given hydrogen concentration and pressure.

At FIG. 1, gaseous mixture reservoir 104 is in fluid communication through conduit 123 with a source producing the gaseous mixture comprised of hydrogen, represented as $H_2$ production source 105. $H_2$ production source 105 may be any process where $H_2$ is produced with a mixture of other gases, such as coal gasification, steam reforming, autothermal reforming, partial oxidation, or other operations or processes on coal, hydrocarbons, or other fuels. $H_2$ production source 105 may further include subsequent processes such as water-gas shift reactions intended to alter the composition of a gaseous mixture while retaining $H_2$ as a constituent gas. Retentate side 102 of $H_2$ separation membrane 101 is in fluid communication with gaseous mixture reservoir 104, such that in operation $H_2$ separation membrane 101 acts to separate $H_2$ from the gaseous mixture generated by $H_2$ production source 105. $H_2$ separation membrane 101 comprised of the ternary alloy $Cu_{(100-x-y)}Pd_xM_y$, where M=Mg, Y, Al, Ti, La, or combinations thereof, is particularly suited for higher temperature $H_2$ separations, such as a membrane reactor operating under post-gasifier conditions, where typical temperatures may be up to 900° C. and typical pressure may be up to 6.89 MPa, along with $H_2S$ concentrations as high as 1000 ppm. Similarly, permeate side 103 of $H_2$ separation membrane 101 is in fluid communication with $H_2$ gas reservoir 106. At FIG. 1, in operation, an exhaust gas depleted of $H_2$ exits hydrogen gaseous mixture reservoir 104 at conduit 120.

$H_2$ separation membrane 101 may have any thickness between retentate side 102 and permeate side 103. When $H_2$ separation membrane 101 is not supported by an underlying substrate, a typical thickness is 30-100 micron (μm). When an underlying substrate is present, $H_2$ separation membrane 101 may have a thickness of 10 μm or less. However, as stated, within this disclosure the thickness of $H_2$ separation membrane 101 is not limiting, and $H_2$ separation membrane 101 may have any thickness sufficient to provide for dissociative chemisorptions of hydrogen on retentate side 102, dissolution of atomic hydrogen from the retentate side 102, pressure-driven diffusion of atomic hydrogen through $H_2$ separation membrane 101, and recombinative desorption from permeate side 103, as is known in the art.

In an embodiment, $H_2$ separation apparatus 100 is further comprised of a $H_2$ gas reservoir 106 in fluid communication with permeate side 103 of $H_2$ separation membrane 101. The $H_2$ gas reservoir 106 serves to contain $H_2$ resulting from recombinative desorption from permeate side 103. As is understood, a purge gas may be utilized as a means for the removal of $H_2$ from $H_2$ gas reservoir 106, as well as means for controlling the $H_2$ partial pressure in $H_2$ gas reservoir 106, in order to foster pressure-driven diffusion of atomic hydrogen through $H_2$ separation membrane 101. At FIG. 1, separated H₂ is removed from H₂ gas reservoir 106 through the action of a purge gas entering through conduit 121 and exiting through conduit 122.

H₂ separation apparatus 100 may be further comprised of and supported by a porous substrate located between permeate side 103 and H₂ gas reservoir 106, where the porous substrate has an external and internal porosity sufficient to maintain fluid communication between permeate side 103 and H₂ gas reservoir 106. The porous substrate may be a planar type or a tubular type. Exemplary materials for the porous substrate include but are not limited to ceramic, porous glass, tantalum, ceramic hollow fibers, vanadium-nickel, and porous sintered metal supports such as porous stainless steel, porous Hastelloy, and Inconel. As is understood, it is advantageous to utilize a support having a similar thermal expansion coefficient to H₂ separation membrane 101 to aid mechanical strength, lessen fragility, resist cracking, and enhance operation at higher pressures and temperatures. The porous substrate may be an asymmetric support having a reduced pore size and/or distribution at locations in contact with H₂ separation membrane 101 as compared to the remaining bulk of the porous substrate, in order to maintain higher hydrogen flux while limiting the pore size effect on the required thickness of the H₂ separation membrane 101, as is known in the art.

H₂ separation apparatus 100 may be further comprised of a diffusion barrier between the permeate side and the porous substrate. As is understood, the effective long-term stability of Pd and Pd alloy membranes is strongly dependent upon the chemical composition of the support and mitigation of intermetallic diffusion between the membrane and the porous substrate. The diffusion barrier may be comprised of, for example, an oxide layer, a high temperature melting layer such as tungsten, tantalum oxide, and the like, a colloidal silica sol layer, an electoplated Ag layer, and other materials known in the art for the prevention of intermetallic diffusion between the permeate side and the porous substrate.

The $Cu_{(100-x-y)}Pd_xM_y$ ternary alloy comprising H₂ separation membrane 101 may be fabricated through various processes known to those skilled in the art, such as a primary element melt, cold rolling, diffusion welding, electroplating, magnetron sputtering, e-beam evaporation, chemical vapor deposition, spray pyrolysis, electroless plating, sequential deposition, and others. Any fabrication method sufficient to produce an $Cu_{(100-x-y)}Pd_xM_y$ ternary alloy of the disclosed composition at a thickness sufficient to generate the H₂ separation described herein is sufficient. The resulting $Cu_{(100-x-y)}Pd_xM_y$ ternary alloy may be further annealed or homogenized prior to use in H₂ separation membrane 101. As is understood, annealing and/or homogenization prior to operational employment of Cu—Pd alloy membranes provides general improvement to both the alloying and subsequent H₂ separation processes. When annealing and/or homogenization is employed, the sufficiency of a time and temperature treatment to enhance formation of the B2 phases as described herein may be discerned through general experience, computational modeling, XRD and/or SEM analysis, or other means known in the art. In an embodiment, the ternary alloy $Cu_{(100-x-y)}Pd_xM_y$ comprising H₂ separation membrane 101 is homogenized at a temperature exceeding about 400° C. for a period of at least 6 hours. Alternatively, annealing may occur in-situ by utilizing H₂ separation membrane 101 for H₂ separation within the temperature range where the B2 phase is expected for the applicable $Cu_{(100-x-y)}Pd_xM_y$ composition.

H₂ separation apparatus 100 may be utilized for the separation of H₂ from a gaseous mixture comprised of H₂ by generating the gaseous mixture utilizing H₂ production source 105, and porting the gaseous mixture from H₂ production means 105 to gaseous mixture reservoir 104 through conduit 123, thereby producing a first hydrogen partial pressure in gaseous mixture reservoir 104. The gaseous mixture may contact retentate side 102 of H₂ separation membrane 101 by virtue of the fluid communication between gaseous mixture reservoir 104 and retentate side 102. Concurrently, H₂ gas reservoir 106 may be maintained at a second hydrogen partial pressure less than the first hydrogen partial pressure using means known in the art, for example a flushing gas entering through conduit 121 and exiting through conduit 122. As a result, H₂ separates from the gaseous mixture in gaseous mixture reservoir 104 through H₂ separation membrane 101 by dissociative chemisorptions of hydrogen on retentate side 102, dissolution of atomic hydrogen from the retentate side 102, pressure-driven diffusion of atomic hydrogen through H₂ separation membrane 101, and recombinative desorption from permeate side 103, as is known in the art. Separated H₂ may then enter H₂ gas reservoir 106 by virtue of the fluid communication between permeate side 103 and H₂ gas reservoir 106, and be subsequently removed from H₂ gas reservoir 106 using the flushing gas or other means for the removal of a gas from a reservoir. H₂ separation apparatus 100 is thereby utilized to generate the separated H₂ in H₂ gas reservoir 106, where the separated H₂ is some portion of the H₂ comprising the gaseous mixture in gaseous mixture reservoir 104. In an embodiment, the gaseous mixture contacts retentate side 102 of H₂ separation membrane 101 at a temperature exceeding about 600° C., where H₂ separation membrane 101 is comprised of the ternary alloy $Cu_{(100-x-y)}Pd_xM_y$ in a B2 phase.

The disclosure thus provides an H₂ separation membrane comprised of an alloy having the composition $Cu_{(100-x-y)}Pd_xM_y$, where x is from about 35 to about 50 atomic percent and where y is from greater than 0 to about 20 atomic percent, and where M consists of magnesium, yttrium, aluminum, titanium, lanthanum, or combinations thereof. The $Cu_{(100-x-y)}Pd_xM_y$ alloy generally maintains a B2 phase at temperatures exceeding comparable Cu—Pd alloys, and allows for utilization of the higher H₂ permeability of the B2 phase in operations where temperatures exceeding the critical temperature of Cu—Pd alloys are routinely exceeded. Due to the phase stabilization and the greater temperature range over which a B2 phase can be maintained, the alloy is well suited for service as a H₂ separation membrane, particularly when applicable conditions are established or cycled above about 600° C. over the course of expected operations.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

$Cu_{(100-x-y)}Pd_xM_y$ alloy; x = 43.75 at. %;
y = 6.25 at. %; M = Mg, Y, Al, Ti, La

| Alloy | $T_s$ (° C.) | $T_f$ (° C.) |
|---|---|---|
| Cu—Pd—Mg | 640 | >860 |
| Cu—Pd—Y | 575-600 | 675-700 |
| Cu—Pd—Al | 650-675 | 825-850 |
| Cu—Pd—Ti | <400 | 775-800 |
| Cu—Pd—La | <400 | 625-650 |

TABLE 2

| | WDXRF Chemical Analysis (wt. %) | | | | | | | | |
|---|---|---|---|---|---|---|---|---|---|
| Alloy | Cu | Pd | Ti | Mg | Zr | Hf | Y | Al | La |
| $Pd_{50}Cu_{50}$ | 38.38 | 61.52 | | | | | | | |
| $Pd_{34}Cu_{66}$ | 54.82 | 45.08 | | | | | | | |
| $Cu_{50}Pd_{43.75}Ti_{6.25}$ | 40.41 | 56.49 | 3.10 | | | | | | |
| $Cu_{66}Pd_{27.25}Ti_{6.25}$ | 58.51 | 38.22 | 3.26 | | | | | | |
| $Cu_{50}Pd_{43.75}Zr_{6.25}$ | 37.53 | 56.04 | | | 6.42 | | | | |
| $Cu_{66}Pd_{27.25}Zr_{6.25}$ | 56.5 | 36.34 | | | 7.15 | | | | |
| $Cu_{50}Pd_{43.75}Hf_{6.25}$ | 34.98 | 51.52 | | | | 12.81 | | | |
| $Cu_{66}Pd_{27.25}Hf_{6.25}$ | 52.81 | 33.69 | | | | 13.14 | | | |
| $Cu_{50}Pd_{43.75}Y_{6.25}$ | 37.41 | 56.57 | | | | | 5.61 | | |
| $Cu_{66}Pd_{27.25}Y_{6.25}$ | 55.64 | 37.70 | | | | | 6.30 | | |
| $Cu_{50}Pd_{43.75}La_{6.25}$ | 37.88 | 53.26 | | | | | | | 8.85 |
| $Cu_{66}Pd_{27.25}La_{6.25}$ | 55.80 | 36.93 | | | | | | | 7.23 |
| $Cu_{50}Pd_{43.75}Al_{6.25}$ | 40.94 | 56.26 | | | | | | 7.81 | |
| $Cu_{66}Pd_{27.25}Al_{6.25}$ | 57.89 | 39.07 | | | | | | 2.11 | |
| $Cu_{50}Pd_{43.75}Mg_{6.25}$ | 40.94 | 57.39 | | 1.67 | | | | | |
| $Cu_{66}Pd_{27.25}Mg_{6.25}$ | 57.92 | 40.98 | | 0.87 | | | | | |

What is claimed is:

1. An $H_2$ separation membrane, where the $H_2$ separation membrane is comprised of an alloy having the composition $Cu_{(100-x-y)}Pd_xM_y$, where x is from about 35 to about 50 atomic percent and where y is from greater than 0 to about 20 atomic percent, and where M is selected from the group consisting of magnesium, yttrium, aluminum, titanium, lanthanum, or combinations thereof, and where the alloy is comprised of a B2 phase, where the B2 phase consists of Cu atoms, Pd atoms, and M atoms.

2. The $H_2$ separation membrane of claim 1 where the B2 phase is a crystal structure, where the crystal structure consists of alternating first layers and second layers, where the first layer consists of a plane of the Cu atoms along a [100] direction of the crystal structure, and where the second layer consists of a plane of the Pd and the M atoms along the [100] direction of the crystal structure.

3. The $H_2$ separation membrane of claim 1 where M is selected from the group consisting of magnesium, yttrium, aluminum, or combinations thereof, and where a B2 phase estimated volume percent is greater than 60% at a temperature of 400° C.

4. The $H_2$ separation membrane of claim 1 where the B2 phase is present at a steady-state temperature between greater than 625° C. and less than 675° C.

5. The $H_2$ separation membrane of claim 1 where M is selected from the group consisting of yttrium, titanium, lanthanum, or combinations thereof, and where y is from greater than 0 to about 10 atomic percent.

6. An apparatus comprised of the $H_2$ separation membrane of claim 1, where the $H_2$ separation membrane has a retentate side and a permeate side, and where the apparatus is further comprised of a gaseous mixture reservoir in fluid communication with the retentate side.

7. The apparatus of claim 6 where the gaseous mixture reservoir is in fluid communication with an $H_2$ production source for producing a gaseous mixture comprised of hydrogen.

8. The apparatus of claim 7 where the $H_2$ production source generates the gaseous mixture comprised of hydrogen, and where the gaseous mixture comprised of hydrogen contacts the retentate side of the $H_2$ separation membrane at a temperature greater than 600° C.

9. The apparatus of claim 6 further comprised of a $H_2$ gas reservoir in fluid communication with the permeate side.

10. The apparatus of claim 9 further comprised of a porous substrate between the permeate side and the $H_2$ gas reservoir.

11. The apparatus of claim 10 further comprised of a diffusion barrier between the permeate side and the porous substrate.

12. A method of separating hydrogen from the gaseous mixture comprised of hydrogen using the $H_2$ separation membrane of claim 9 comprising:
  generating a gaseous mixture comprised of hydrogen using an $H_2$ production source;
  porting the gaseous mixture comprised of hydrogen to the gaseous mixture reservoir, thereby producing a first hydrogen partial pressure in the gaseous mixture reservoir;
  contacting the gaseous mixture comprised of hydrogen and the retentate side of the $H_2$ separation membrane;
  maintaining the $H_2$ gas reservoir at a second hydrogen partial pressure, where the second hydrogen partial pressure is less than the first hydrogen partial pressure; and
  removing separated hydrogen from the permeate side of the $H_2$ separation membrane, where the separated hydrogen is some portion of the hydrogen comprising the gaseous mixture comprised of hydrogen,
thereby separating hydrogen from the gaseous mixture comprised of hydrogen.

13. The method of claim 12 where the gaseous mixture comprised of hydrogen contacts the retentate side of the $H_2$ separation membrane at a temperature greater than 600° C.

14. An apparatus for the separation of $H_2$ from a gaseous mixture comprised of hydrogen, the apparatus comprising:
  an $H_2$ separation membrane having a retentate side and a permeate side, where the H2 separation membrane is comprised of an alloy having the composition $Cu_{(100-x-y)}Pd_xM_y$, where x is from about 35 to about 50 atomic percent and where y is from greater than 0 to about 20 atomic percent, and where M is selected from the group consisting of magnesium, yttrium, aluminum, titanium, lanthanum, or combinations thereof, and where the alloy is comprised of a B2 phase, where the B2 phase consists of Cu atoms, Pd atoms, and M atoms;

a gaseous mixture reservoir in fluid communication with the retentate side; and an $H_2$ gas reservoir in fluid communication with the permeate side.

15. The apparatus of claim 14 where the B2 phase is comprised of a crystal structure, where the crystal structure consists of alternating first layers and second layers, where the first layer consists of a plane of the Cu atoms along a [100] direction of the crystal structure, and where the second layer consists of a plane of the Pd and the M atoms along the [100] direction of the crystal structure.

16. The apparatus of claim 15 where the gaseous mixture reservoir is in fluid communication with an $H_2$ production source for producing a gaseous mixture comprised of hydrogen, and where the $H_2$ production source generates the gaseous mixture comprised of hydrogen at a temperature greater than 600° C., and where the gaseous mixture comprised of hydrogen contacts the retentate side of the $H_2$ separation membrane at the temperature greater than 600° C.

17. The apparatus of claim 16 where M is selected from the group consisting of magnesium, aluminum, yttrium, or combinations thereof.

18. The apparatus of claim 17 where y is from greater than 0 to about 10 atomic percent.

19. A method of separating hydrogen from the gaseous mixture comprised of hydrogen using the apparatus of claim 18 comprising:

generating the gaseous mixture comprised of hydrogen using the $H_2$ production source;

porting the gaseous mixture comprised of hydrogen to the gaseous mixture reservoir, thereby producing a first hydrogen partial pressure in the gaseous mixture reservoir;

contacting the gaseous mixture comprised of hydrogen and the retentate side of the H2 separation membrane, where the gaseous mixture comprised of hydrogen contacts the retentate side of the $H_2$ separation membrane at a temperature greater than 600° C.;

maintaining the $H_2$ gas reservoir at a second hydrogen partial pressure, where the second hydrogen partial pressure is less than the first hydrogen partial pressure; and removing separated hydrogen from the permeate side of the $H_2$ separation membrane, where the separated hydrogen is some portion of the hydrogen comprising the gaseous mixture comprised of hydrogen, thereby separating hydrogen from the gaseous mixture comprised of hydrogen.

20. An apparatus for the separation of hydrogen from a gaseous mixture comprised of hydrogen, the apparatus comprising:

an $H_2$ separation membrane having a retentate side and a permeate side, where the $H_2$ separation membrane is comprised of an alloy having the composition $Cu_{(100-x-y)}Pd_xM_y$, where x is from about 35 to about 50 atomic percent and where y is from greater than 0 to about 10 atomic percent, and where M is selected from the group consisting of magnesium, yttrium, aluminum, or combinations thereof, and where the B2 phase is a crystal structure, where the crystal structure consists of alternating first layers and second layers, where the first layer consists of a plane of the Cu atoms along a [100] direction of the crystal structure, and where the second layer consists of a plane of the Pd and the M atoms along the [100] direction of the crystal structure; and a gaseous mixture reservoir in fluid communication with the retentate side, where the gaseous mixture reservoir is in fluid communication with an $H_2$ production source for producing a gaseous mixture comprised of hydrogen, and where the $H_2$ production source generates the gaseous mixture comprised of hydrogen at a temperature greater than 600° C.; and an $H_2$ gas reservoir in fluid communication with the permeate side.

* * * * *